United States Patent
Ariga et al.

[11] Patent Number: 6,115,068
[45] Date of Patent: Sep. 5, 2000

[54] POSITIONABLE IMAGE INPUT APPARATUS

[75] Inventors: Kazuto Ariga; Seiji Iida, both of Tokyo, Japan

[73] Assignee: Canon Kabushiki Kaisha, Tokyo, Japan

[21] Appl. No.: 08/664,256

[22] Filed: Jun. 7, 1996

[30] Foreign Application Priority Data

| Jun. 14, 1995 | [JP] | Japan | 7-147909 |
| Jun. 14, 1995 | [JP] | Japan | 7-147910 |
| Jun. 14, 1995 | [JP] | Japan | 7-147911 |
| Jun. 14, 1995 | [JP] | Japan | 7-147912 |
| Jun. 14, 1995 | [JP] | Japan | 7-147913 |

[51] Int. Cl.$^7$ .................................................. H04N 5/225
[52] U.S. Cl. ......................... 348/373; 348/207; 403/181
[58] Field of Search .................................. 348/207, 273, 348/374, 375, 376; 355/64, 67, 70; 403/50, 53, 180, 181; 362/419, 428, 427, 418, 413, 285, 287; 248/121, 122, 126, 127, 249, 251, 255; H04N 5/225

[56] References Cited

U.S. PATENT DOCUMENTS

| 3,066,219 | 11/1962 | Duddy | 362/419 |
| 3,856,251 | 12/1974 | Miller . | |
| 4,328,536 | 5/1982 | Wallmark . | |
| 4,916,550 | 4/1990 | Miyake et al. . | |
| 5,108,061 | 4/1992 | Vlasak . | |
| 5,154,390 | 10/1992 | Bain et al. . | |
| 5,247,330 | 9/1993 | Ohyama et al. | 348/375 |
| 5,422,802 | 6/1995 | Lin . | |
| 5,697,885 | 12/1997 | Konomura et al. | 348/220 |

FOREIGN PATENT DOCUMENTS

| 0 480 232 | 4/1992 | European Pat. Off. . |
| 44 30 559 | 3/1995 | Germany . |
| 673 148 | 2/1990 | Switzerland . |
| 2 133 576 | 7/1984 | United Kingdom . |

OTHER PUBLICATIONS

European Search Report in Application No. EP 96 30 4398 dated May 7, 1999 which cites the references disclosed herein.

*Primary Examiner*—Tuan Ho
*Attorney, Agent, or Firm*—Morgan & Finnegan, LLP

[57] ABSTRACT

This invention provides an image input apparatus which allows easy positioning between an original and a camera head and can improve operability in a document photographing mode. The apparatus has a camera head arranged at the distal end side of columns coupled via a plurality of joint portions, a signal processing unit incorporated in a base of the apparatus main body that supports the proximal end side of the columns, and a cable which is arranged along the columns and connects the camera head and the signal processing unit. When an image signal is input from the camera head to the signal processing unit, the optical axis direction of the camera head and its angle about the optical axis are adjustable via the joint portions. The camera has a lens portion which allows a rotation operation, and an index that can indicate its rotation state is at an appropriate position on the outer surface of the lens portion. The column is supported by the base via a third joint portion. A signal processing circuit board is arranged between a bottom plate and a weight which are electrically connected to each other. An index indicating the direction of the camera head with respect to the base is arranged at least at the center of the front surface of the base. The apparatus is arranged so that the route of the cable does not interfere with the pivot axes of the respective joint portions.

15 Claims, 25 Drawing Sheets

FIG. 11
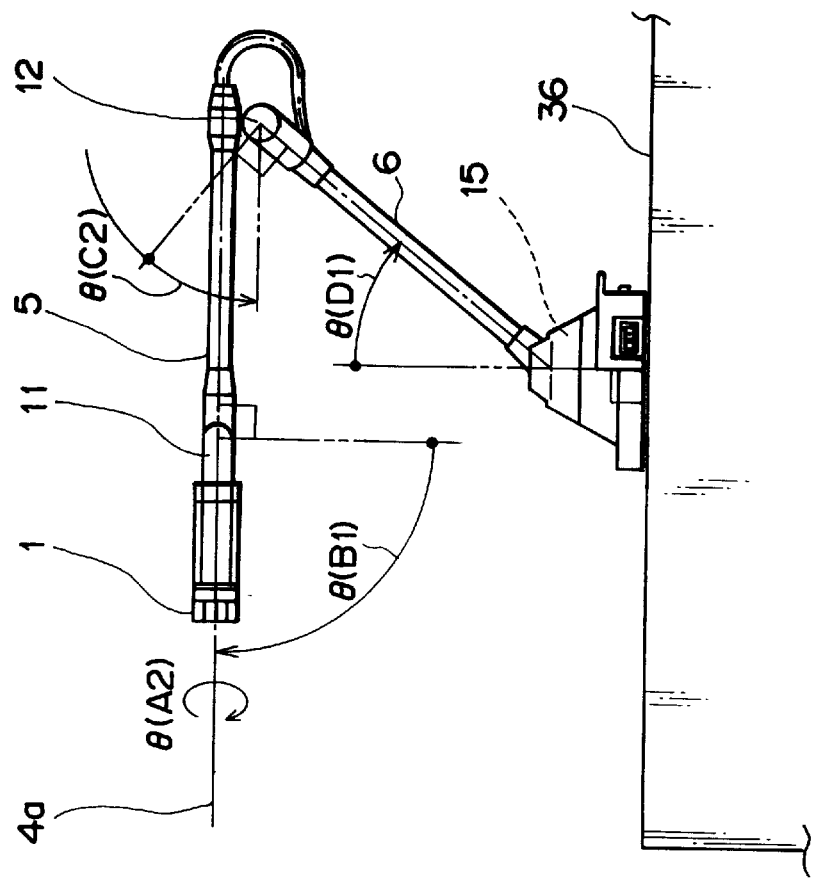
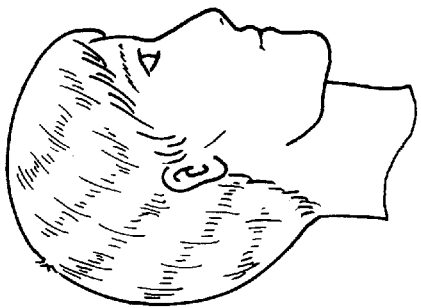

POSITIONABLE IMAGE INPUT APPARATUS

BACKGROUND OF THE INVENTION

The present invention relates to an image input apparatus for picking up images of objects such as various kinds of documents, a person, and the like. A conventional image input apparatus of this type will be explained below with reference to FIGS. 24 and 25. Referring to FIG. 24, reference numeral 301 denotes a lens; 302, a camera head which incorporates a CCD element and its circuit board (neither are shown); and 303, an arm which is constituted by a bellows- or spiral-shaped metal pipe. A signal cable is inserted through the arm 303, which can be bent to an arbitrary shape. Reference numeral 304 denotes a base which incorporates a main circuit board (to be described later) and is coupled to a chassis which also serves as a weight; 305, a monitor connected via a cable 306; 307, an original; 308, an operator or his or her position; and 309, an image of the operator as an object displayed on the monitor 305.

A portrait photographing operation as a typical use method of the conventional image input apparatus with the above-mentioned arrangement will be described below. First, the operator turns on a power switch (not shown) arranged on the base 304. Then, an image of the object (person) picked up by the camera head 302 is displayed on the monitor 305. In the case of FIG. 24, since the camera head 302 picks up an image of the photographer at the position 308, the monitor 305 displays the image 309 of the operator. At this time, a focusing ring provided to the lens 301 is turned to attain a focusing operation, as needed.

A document photographing operation for picking up an image of the original 307 placed on the desk will be described below. When the document photographing operation is performed, the operator holds the camera head 302 to move it to a position 302a indicated by a broken line in FIG. 24. Since the arm 303 is constituted by the bellows-shaped metal pipe that can be bent to an arbitrary shape, the operator can easily move the camera head 302.

The operator places the original 307 with respect to the camera head 302 moved to the position 302a, so that the lower side of the original is located on the base side (erected state when viewed from the base 304), as shown in FIG. 24. The original 307 must be placed in such direction since the CCD is attached to the camera head 302 to have a normal up-and-down direction in the portrait photographing operation. For this reason, in the document photographing operation, the up-and-down direction of the original 307 must be set in correspondence with the direction of the CCD, as shown in FIG. 24. With this adjustment, an image of the original 307 picked up by the camera head 302 at the position 302a can be displayed on the monitor 305 to have a normal direction, thus realizing a document photographing operation. At this time, the focusing ring provided to the lens 301 is turned to attain a focusing operation, as needed.

The internal arrangement of the base 304 will be described below with reference to FIG. 25. Referring to FIG. 25, the base 304 comprises a cylindrical portion 304a for holding the arm 303, and is fixed to a chassis 315 by screws (not shown). A main circuit board 316 is fixed to the chassis 315 by screws. Circuit boards 317, 318, and 319 are connected to the main circuit board 316 via connectors 320, 321, and 322, thus assuring a board area by effectively utilizing the internal space of the base 304.

The main circuit board 316 also has a connector 316a for receiving a cable (in this embodiment, a flexible circuit board consisting of polyimide) for transferring signals from the camera head 302, and an image output terminal for receiving the cable 306 (FIG. 24). The chassis 315 comprises a substantially cubic block 315a consisting of a zinc-based material. The block 315a has not only a role of the bottom plate to which the main circuit board 316 and the base 304 are attached, but also a role of a weight that stably supports the entire apparatus.

However, the above-mentioned prior art suffers the following problems.

(1) When the position of the original 307 is offset from the front side of the main body 304 in the document photographing mode, the camera head 302 must be moved to the center of the original 307, and its inclination must then be adjusted in correspondence with the direction of the original 307. However, as described above, since the arm 303 that supports the camera head 302 is constituted by the bellows-shaped pipe, it can only be bent only slowly. Therefore, the position of the original 307 that can be followed by the camera head 302 is limited.

(2) Since the arm 303 is flexible, it is difficult for the operator due to a so-called spring back to move and adjust the position of the camera head to that the operator intended. Furthermore, the operator must check the image of the original 307 displayed on the screen of the monitor 305 while performing the above-mentioned operation, resulting in poor operability.

In the above-mentioned prior art, the focus ring of the lens 301 has no indices indicating in-focus distances. For this reason, the operator cannot initially determine the direction to turn the ring, resulting in poor operability. The operator may become accustomed with this operation to some extent as he or she uses this apparatus for a long time. However, if the operator operates the focus ring a certain interval after his or her previous operation, the same problem as described above may be posed upon restarting the operation.

In the above-mentioned prior art, as shown in FIG. 25, since the base 304 which covers the main circuit board 316 consists of a resin material, the entire main circuit board 316 cannot be electrically shielded. Note that the chassis 315 can shield the circuit board 316 not entirely but partially. In an image input apparatus of this type, noise against an image signal has a considerable influence on the image quality of an output image. The conventional apparatus is weak against noise since the main circuit board 316 which mounts a large number of electronic elements and the like cannot be sufficiently shielded. The image quality of an output image may often deteriorate under the influence of noise.

In the above-mentioned prior art, especially in the document photographing mode, there is no reference or index that indicates the position of the original 307 to be placed. In addition, the camera head 302 is free to move, and is difficult to be fixed in position. The operator must change the position of the original 307 or move the camera head 302 in a trial-and-error manner while gazing the displayed image of the original 307, so as to normally display the image of the original 307 on the screen of the monitor 305, resulting in cumbersome operations. As described above, when the original 307 is to be placed, troublesome positioning operations are required in association with the camera head 302, resulting in poor operability.

SUMMARY OF THE INVENTION

It is the first object of the present invention to provide an image input apparatus which can facilitate the positioning operation of an original and a camera head and can improve operability in a document photographing mode.

According to the present invention, there is provided an image input apparatus in which an image signal obtained by an image pickup unit is input to the apparatus main body to perform signal processing of the input signal, comprising a camera head arranged at the distal end side of columns which are coupled via a plurality of joint portions, a signal processing unit which is incorporated in a base of the apparatus main body, which supports the proximal end side of the columns, and a cable which is arranged along the columns and connects the camera head and the signal processing unit, wherein when the image signal is input from the camera head to the signal processing unit, the optical axis direction and the angle about the optical axis of the camera head can be adjusted via the joint portions.

The apparatus further comprises a first joint portion consisting of a first hinge portion and a first pivot portion, a second joint portion consisting of a second hinge portion, a third joint portion consisting of a third hinge portion and a second pivot portion, and a pair of columns coupled via the second joint portion, at least the first hinge portion of the first joint portion can be pivoted through not less than 90°, and at least the first pivot portion can be pivoted through not less than 180°.

The camera head can be translated by pivoting the first pivot portion of the first joint portion and the second pivot portion of the third joint portion in opposite directions by the same amount.

According to the present invention, the camera head can be held at an arbitrary position via the plurality of hinge portions, the plurality of columns, and the plurality of pivot portions, and is rotatable about the optical axis. One of the pivot portions has a pivot range of 180° or more, and one of the hinge portions has a pivot range of 90° or more. Furthermore, the pivot angle of the second pivot portion can be set to be equal to that of the first pivot portion in a predetermined range in which an image of an object is to be picked up. Even when the placed position of an original is offset from the front side of the apparatus main body, the position of the camera head can be adjusted in correspondence with the original position, and any inclination of the camera head can be adjusted in correspondence with that of the original. In other words, since the original need not be accurately placed in front of the apparatus main body, the operability in the document photographing mode can be improved, and an appropriate document photographing operation is guaranteed even when the position of the original is offset. Furthermore, even when the camera head is moved to the corner portion of the original, the image of the original can be picked up without skewing the image displayed on the screen of the monitor, thus improving operability.

It is the second object of the present invention to provide an image input apparatus which allows an operator to adequately recognize the rotation direction and the like of a focus ring and can improve operability in a photographing operation.

According to the present invention, there is provided an image input apparatus in which an image signal obtained by an image pickup unit is input to the apparatus main body to perform signal processing of the input signal, comprising a camera head arranged at the distal end side of columns which are coupled via a plurality of joint portions, a signal processing unit which is incorporated in a base of the apparatus main body, which supports the proximal end side of the columns, and a cable which is arranged along the columns and connects the camera head and the signal processing unit, wherein the camera head comprises a lens portion which allows a rotation operation, and an index that can indicate the rotation operation state is arranged at an appropriate position on the outer surface of the lens portion.

The angle of the camera head at least about the optical axis can be adjusted via the joint portions, and a plurality of indices that can indicate a rotation operation state are arranged at 180° separated positions on the outer surface of the lens portion.

The apparatus further comprises a first joint portion consisting of a first hinge portion and a first pivot portion, a second joint portion consisting of a second hinge portion, a third joint portion consisting of a third hinge portion and a second pivot portion, and a pair of columns coupled via the second joint portion, and the camera head is supported by one end of the first column via the first joint portion so that the optical axis direction with respect to the first column and the pivot angle about the optical axis of the camera head can be adjusted.

An indication portion for indicating a photographing mode is arranged at an appropriate position on the outer case of the camera head.

The camera head is supported via the columns and the joint portions to be rotatable through at least 180° with respect to the base and a plurality of indication portions for indicating photographing modes corresponding to pivot positions are arranged at appropriate positions on the outer case of the camera head.

According to the present invention, when an object is photographed using the camera head, the camera head can be moved to a desired position by appropriately pivoting the joint portions, thus allowing a portrait or document photographing operation. In this case, in, e.g., the document photographing mode, the operator can easily recognize the rotation direction of the focus or aperture ring, thus improving operability.

In the apparatus of the present invention, the portrait or document photographing mode can be selectively executed by operating the respective joint portions. In this case, the outer case of the camera head is pivoted through 180° upon switching the mode. As described above, since the outer case of the camera head has the indication portion for indicating the current photographing mode in addition to the index of the lens portion itself, the operator can easily recognize the index in either the portrait or document photographing mode, thus improving operability.

It is the third object of the present invention to provide an image input apparatus which has a is structure strong against noise.

According to the present invention, there is provided an image input apparatus in which an image signal obtained by an image pickup unit is input to the apparatus main body to perform signal processing of the input signal, comprising a camera head arranged at the distal end side of columns which are coupled via a plurality of joint portions, a signal processing unit which is incorporated in a base of the apparatus main body, which supports the proximal end side of the columns, and a cable which is arranged along the columns and connects the camera head and the signal processing unit, wherein the base comprises a metal bottom plate, a signal processing circuit board, a metal weight, and a resin cover.

The apparatus further comprises a first joint portion consisting of a first hinge portion and a first pivot portion, a second joint portion consisting of a second hinge portion, a third joint portion consisting of a third hinge portion and a second pivot portion, and a pair of columns coupled via the second joint portion, the base supports the columns via the third joint portion, the bottom plate and the weight are electrically connected to each other, and the signal processing circuit board is arranged between the bottom plate and the weight.

The camera head is supported by one end of a first column via the first joint portion so that the optical axis direction with respect to the first column and the pivot angle about the optical axis of the camera head can be adjusted, the first column is supported at the other end thereof via the second joint portion, so that the axial direction with respect to the second column can be adjusted, and the second column is supported at its proximal end via the third joint portion, so that the axial direction with respect to the vertical axis of the base and the pivot angle about the axis of the second column can be adjusted.

According to the present invention, since the base is constituted by the metal bottom plate, the signal processing circuit board, the metal weight, and the resin cover, and the signal processing circuit board is arranged between the metal bottom plate and the metal weight, the signal processing circuit board is enclosed by the metal bottom plate and the metal weight. Therefore, the signal processing circuit board, which is easily influenced by noise, is electrically shielded, thus realizing a structure which is very strong against noise.

In order to shield a circuit board, it is a common practice to arrange a metal shield case on the circuit board. However, when such shield case is added, the number of parts increases, and the structure becomes complicated. In the present invention, since the weight for keeping the balance of the apparatus also serves as a shield case, no new shield case need be added. For this reason, a low-cost image input apparatus which is strong against noise and has a simple structure can be realized.

It is the fourth object of the present invention to provide an image input apparatus which can accurately and easily adjust the positions of an original and a camera head, and can improve the operability in a document photographing mode.

According to the present invention, there is provided an image input apparatus in which an image signal obtained by an image pickup unit is input to the apparatus main body to perform signal processing of the input signal, comprising: a camera head arranged at the distal end side of columns which are coupled via a plurality of joint portions, a signal processing unit which is incorporated in a base of the apparatus main body, which supports the proximal end side of the columns, and a cable which is arranged along the columns and connects the camera head and the signal processing unit, wherein an index for indicating the direction of the camera head with respect to the base is arranged at least at the center of the front surface of the base.

The index comprises an indication portion which is arranged at the center of the front surface of the base and indicates the operation state of the apparatus.

The apparatus further comprises a first joint portion consisting of a first hinge portion and a first pivot portion, a second joint portion consisting of a second hinge portion, a third joint portion consisting of a third hinge portion and a second pivot portion, and a pair of columns coupled via the second joint portion, the camera head is supported by the first column via the first joint portion, the second column is supported by the base via the third joint portion, and the index indicates the direction of the camera head with respect to the base.

The camera head is supported by one end of a first column via the first joint portion so that the optical axis direction with respect to the first column and the pivot angle about the optical axis of the camera head can be adjusted, the first column is supported at the other end thereof via the second joint portion, so that the axial direction with respect to the second column can be adjusted, and the second column is supported at its proximal end via the third joint portion, so that the axial direction with respect to the vertical axis of the base and the pivot angle about the axis of the second column can be adjusted.

According to the present invention, when an object is photographed using the camera head, the camera head can be moved to a desired position by appropriately pivoting the joint portions, thus allowing a portrait or document photographing operation. In this case, in, e.g., the document photographing mode, an original or the like can be easily positioned with respect to the apparatus main body with reference to the index of the base that supports the camera head. At the same time, since the camera head can also be easily positioned with respect to the apparatus main body, the operability in the document photographing mode can be improved. In this case, since the index is provided at the center of the front surface of the base, a reference position for the positioning operation can be easily determined, thus guaranteeing an easy and accurate operation.

Since the indication portion serving as a function element of the apparatus, which indicates the operation state (energization state) of the apparatus is used as one index, the apparatus can be smartly designed. Since the indication portion is effectively used as a reference mark without adding another index, the operability in the document photographing mode can be effectively improved without disturbing the apparatus design.

Furthermore, according to the image input apparatus of the type to which the present invention is applied, since a sufficient space cannot be assured around the pivot shaft due to, e.g., a size reduction of the apparatus, the cable is bent at a small radius of curvature. For this reason, when the columns are pivoted about the respective hinge portions, an excessive load may act on the bent portion of the cable and may disconnect the cable.

It is the fifth object of the present invention to provide a compact image input apparatus which comprises hinge portions, which can appropriately lay a cable without applying any excessive load to the cable.

According to the present invention, there is provided an image input apparatus in which an image signal obtained by an image pickup unit is input to the apparatus main body to perform signal processing of the input signal, comprising a camera head arranged at the distal end side of columns which are coupled via a plurality of joint portions, a signal processing unit which is incorporated in a base of the apparatus main body, which supports the proximal end side of the columns, and a cable which is arranged along the columns and connects the camera head and the signal processing unit, wherein the apparatus has an arrangement that can prevent the route of the cable from interfering with the pivot axes of the joint portions when the cable is laid.

The apparatus further comprises a first joint portion consisting of a first hinge portion and a first pivot portion, a second joint portion consisting of a second hinge portion, a third joint portion consisting of a third hinge portion and a second pivot portion, and a pair of columns coupled via the second joint portion, and the first and third hinge portions in the first and third joint portions are arranged on the two sides of the cable so that the cable is linearly laid along the first and third joint portions.

The apparatus further comprises a first joint portion consisting of a first hinge portion and a first pivot portion, a second joint portion consisting of a second hinge portion, a third joint portion consisting of a third hinge portion and a second pivot portion, and a pair of columns coupled via the second joint portion, the cable is inserted through the respective columns, and the cable is exposed from the second joint portion that couples the columns and is laid in a loop pattern.

According to the present invention, when the camera head is pivoted about the first hinge portion, the cable slides toward the second hinge portion side in the first column. Since the first hinge portion has no pivot axis that interferes with the cable, the cable can form a large R (radius of curvature) at the first hinge portion, and hence, no load is imposed on the cable. In this case, the cable is externally exposed from the second hinge portion in a substantially arcuated shape, and is laid in a free state. Thus, the second hinge portion constitutes a buffer for the cable, and the cable can smoothly slide inside the first column.

More specifically, when the camera head is pivoted about the first hinge portion, a force that acts to push the cable toward the second hinge portion side is generated. Upon reception of this force, the cable portion exposed from the second hinge portion slides toward the second hinge portion side. If the cable is fixed at the second hinge portion, the pushing force is concentrated on the cable portion at the first hinge portion since the cable cannot slide. As a result, the cable may buckle and may eventually be disconnected. When the first and second columns pivot about the second hinge portion as a fulcrum, the cable portion exposed from the second hinge portion is curved or bent with a large R. For this reason, local concentration of stress on the cable can be prevented, thereby avoiding cable disconnection.

Furthermore, when the second column pivots about the third hinge portion as a fulcrum, since the third hinge portion has no pivot axis that interferes with cable, the cable can also form a large R at the third hinge portion. Therefore, in this case as well, no load acts on the cable. As described above, a compact image input apparatus which comprises the hinge portions that do not impose any load on the cable, and has no original table can be realized.

According to the present invention, a structure around the hinge portions that do not impose any load on a cable may be effectively applied to other electronic equipments or apparatuses. For example, in an apparatus which connects one member arranged at the distal end side of columns coupled via joint portions, and the other member arranged on a base of the apparatus main body that supports the base end side of the columns using a cable arranged along the columns, the cable is laid so that its route does not interfere with the pivot axes of the respective joint portions. With this arrangement, in such apparatus, the cable can be laid without causing disconnection at the hinge portions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 is a schematic side view for explaining a portrait photographing operation in the embodiment of the present invention;

DESCRIPTION OF THE PREFERRED EMBODIMENTS

The preferred embodiments of an image input apparatus according to the present invention will be described hereinafter with reference to the accompanying drawings.

Figure 1:
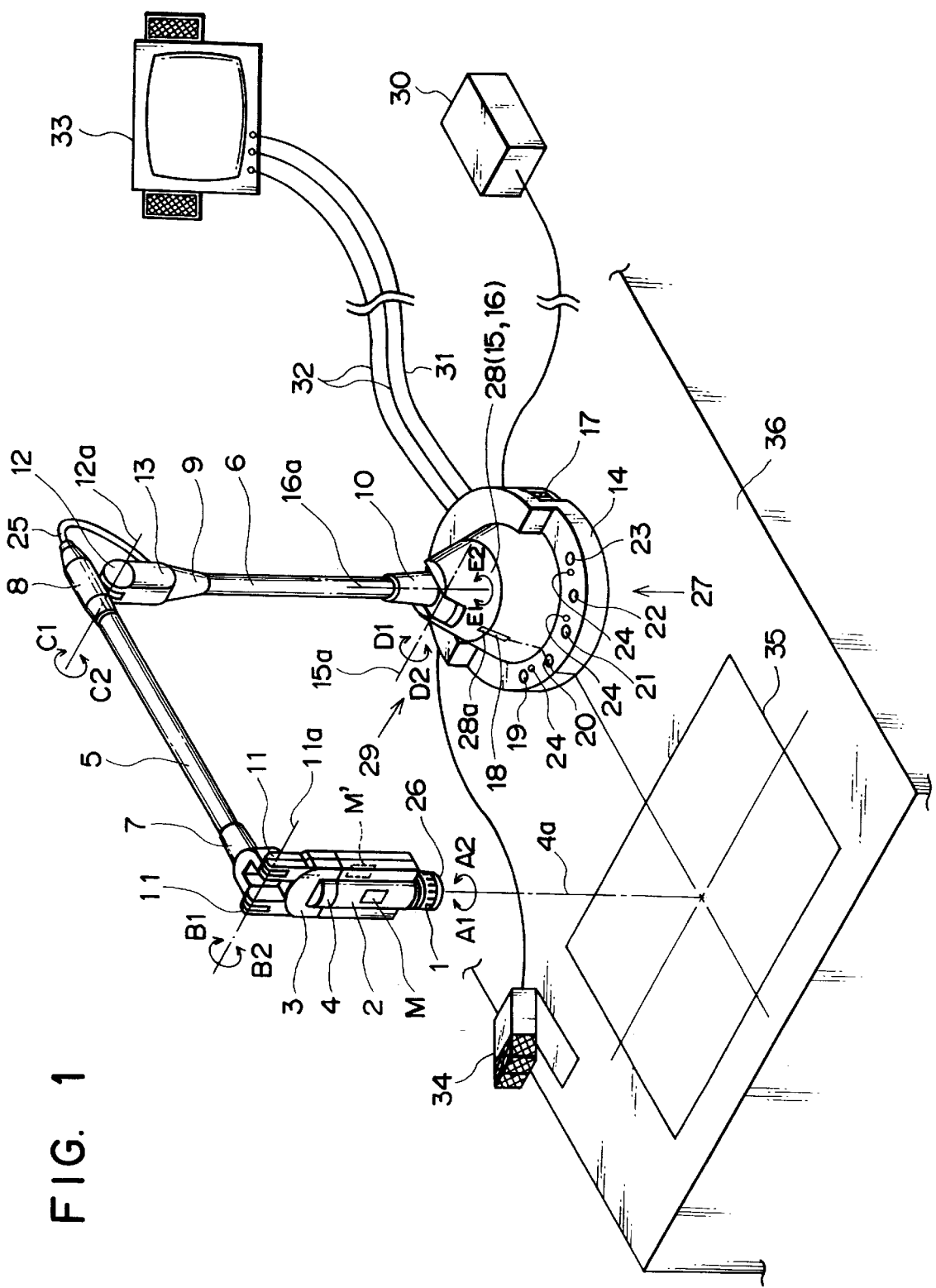
FIG. 1 is a perspective view best illustrating the outer appearance of an image input apparatus according to an embodiment of the present invention.

FIG. 1 is a perspective view best illustrating the characteristic feature of the present invention. Referring to FIG. 1, reference numeral 1 denotes a lens, which comprises a focus adjustment ring 1a and an aperture adjustment ring 1b (to be described later). An alternate long and short dashed line in FIG. 1 indicates the optical axis direction of the lens 1. Reference numeral 2 denotes a camera head which includes a CCD as an image pickup element and an electronic circuit board for performing image signal processing (neither are shown).

Reference numeral 3 denotes a head base for supporting the camera head 2. The camera head 2 and the head base 3 are axially supported by a first pivot portion 4 to be pivotal in the directions of arrows A1 and A2 about an axis 4a agreeing with the lens optical axis. Reference numeral 5 denotes an arm serving as a first column for supporting the camera head 2; and 6, an arm serving as a second column. These arms 5 and 6 respectively comprise hollow pipes, and joints 7 and 8, and 9 and 10 are respectively coupled to the two-end portions of these arms 5 and 6 by press-fitting. The joint 7 and the head base 3 are axially supported by a hinge 11 serving as a first hinge portion to be pivotal in the directions of arrows B1 and B2 about a central axis 11a indicated by an alternate long and short dashed line. Note that the first pivot portion 4 and the hinge 11 constitute a first joint portion.

The joints 8 and 9 are axially supported by a hinge 12 serving as a second hinge portion to be pivotal in the directions of arrows C1 and C2 about a central axis 12a indicated by an alternate long and short dashed line. The hinge 12 and the joint 9 are covered by an outer case 13. Note that the hinge 12 constitutes a second joint portion.

The joint 10 is axially supported by a hinge 15 (not shown) serving as a third hinge portion and a second pivot portion 16 to be pivotal in the directions of arrows D1 and D2 and in the directions of arrows E1 and E2 with respect to a main body base 14 serving as a base about central axes 15a and 16a indicated by alternate long and short dashed lines. Note that the second pivot portion 16 and the hinge 15 constitute a third joint portion.

The main body base 14 includes an electronic circuit board serving as a signal processing unit for performing image signal processing, input/output control, and the like, and a weight for improving the stability of the apparatus, which are not shown in FIG. 1. Furthermore, the main body base 14 comprises a power switch 17, a power LED lens 18 for externally guiding light emitted by a power LED which is arranged on the circuit board and indicates the ON/OFF state of the power supply, switches for attaining various functions, and LED lenses indicating their operation states. Reference numeral 19 denotes an automatic gain control switch (to be referred to as an AGC switch hereinafter) for automatically controlling the brightness of an image; 20, a negative/positive reversal switch; 21, a microphone mute switch; and 22, a white balance switch (to be referred to as a WB switch hereinafter). With the WB switch 22, the color tones can be adjusted. On the circuit board, LEDs indicating the operation states of the switches 19, 21, and 22 are arranged, and light beams emitted from these LEDs are externally guided via an LED lens 24. Reference numeral 25 denotes a main cable, which connects the circuit board in the camera head 2 and that in the main body base 14. The main cable 25 serving as a cable in the present invention runs through the interiors of the arms 5 and 6. Portions of the main cable 25 are exposed between the head base 3 and the joint 7, and between the joints 8 and 9. Although not shown, the two ends of the cable 25 are respectively clamped by the head base 3 and the main body base 14. Reference numeral 26 denotes a lens cap which protects the lens 1 when the apparatus is not used.

Reference numeral 27 denotes rubber legs (not shown) which are arranged on the bottom surface of the main body base 14, and are used for preventing the apparatus from slipping and for improving the stability of the apparatus; and 28, a hinge cover which pivots about the central axis 16a together with the hinge 16. The hinge cover 28 has an index 28a that matches the power LED lens 18 when the camera head 2 is located on the central line of the main body base 14. Furthermore, reference numeral 30 denotes an AC adapter for converting an AC current into a DC current; 31 and 32, connection cords used for outputting an image signal and stereophonic audio signals to an external monitor 33 with stereophonic loudspeakers. The AC adapter 30 and the connection cords 31 and 32 are respectively connected to a DC input terminal, an image output terminal, and audio output terminals arranged on the rear surface of the main body base 14. Reference numeral 34 denotes an external microphone which picks up a voice of an operator as stereophonic audio data. The microphone 34 is connected to a microphone input terminal 29 arranged on the side surface of the main body base 14. Reference numeral 35 denotes an original as an object.

Figure 2:
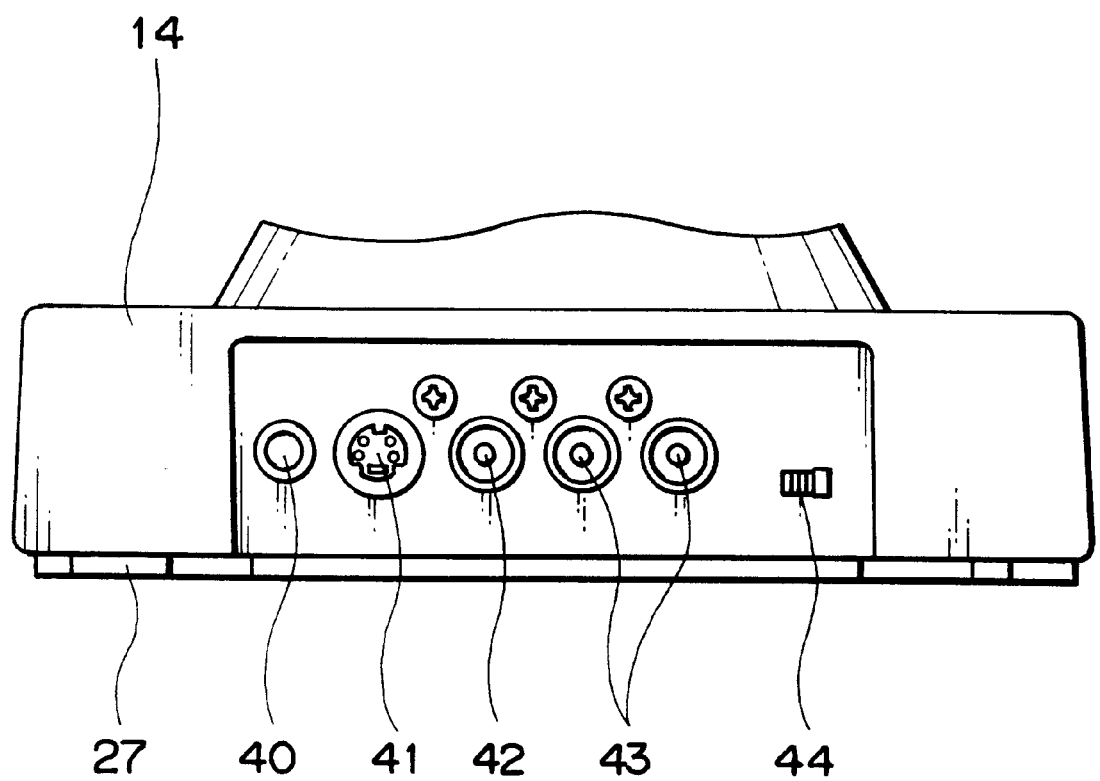
FIG. 2 is a schematic rear view for explaining a rear panel in the embodiment of the present invention.

FIG. 2 shows the input/output terminal panel arranged on the rear surface of the main body base 14. Referring to FIG. 2, reference numeral 40 denotes a DC input terminal which is connected to the above-mentioned AC adapter 30; 41, an S terminal serving as the above-mentioned image output terminal; and 42, a video terminal serving as the above-mentioned image output terminal. Reference numeral 43 denotes audio output terminals described above, which consist of two, (R) and (L) stereophonic terminals. Reference numeral 44 denotes a selection switch for selecting a desired shutter speed.

Figure 3:
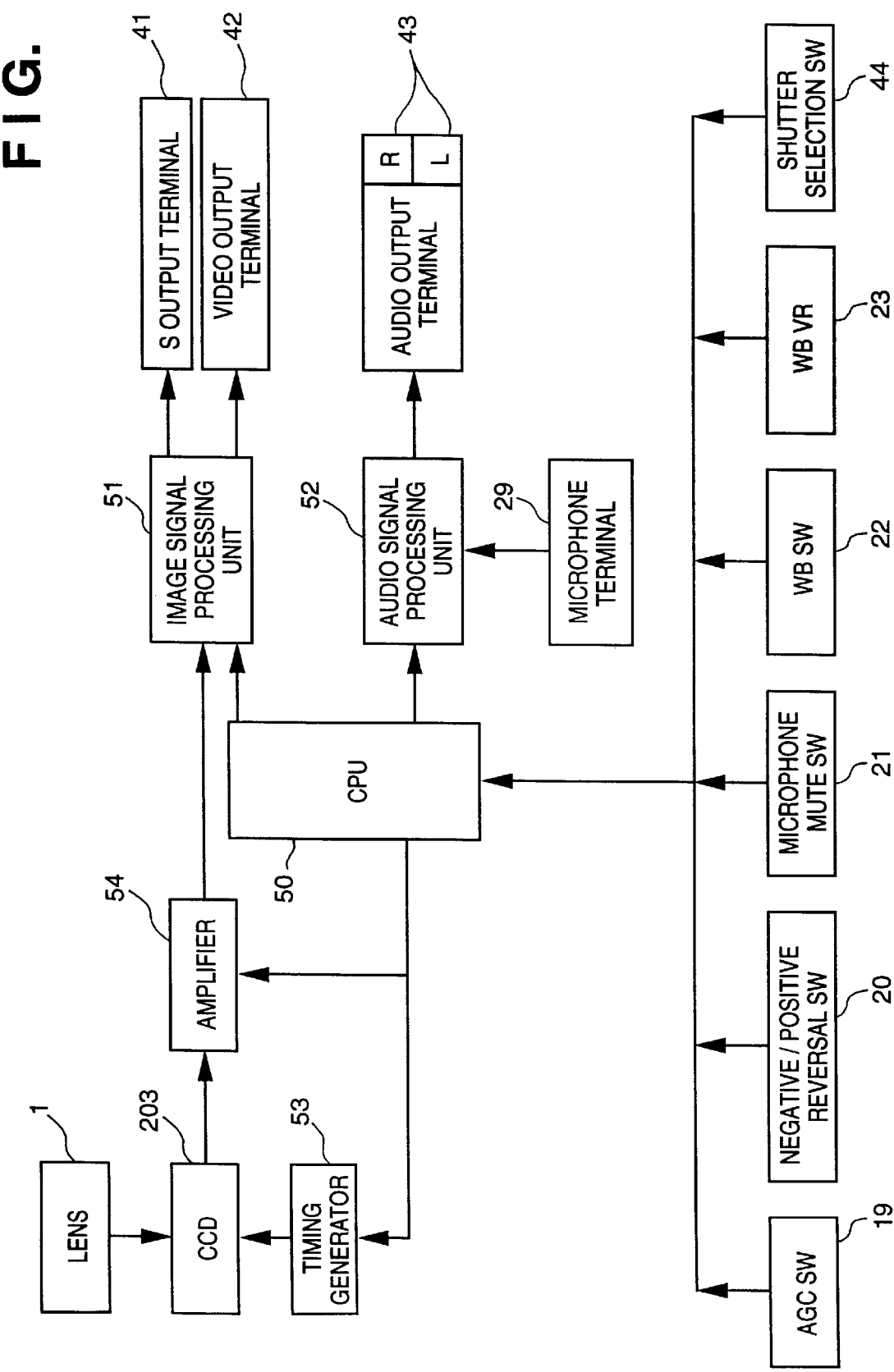
FIG. 3 is a block diagram for explaining signal exchange in the embodiment of the present invention.

FIG. 3 is a block diagram for explaining an example of signal processing in the embodiment of the present invention. Referring to FIG. 3, reference numeral 50 denotes a CPU; 51, an image signal processing unit; 52, an audio signal processing unit; 53, a timing generator; and 54, an amplifier.

Figure 4:
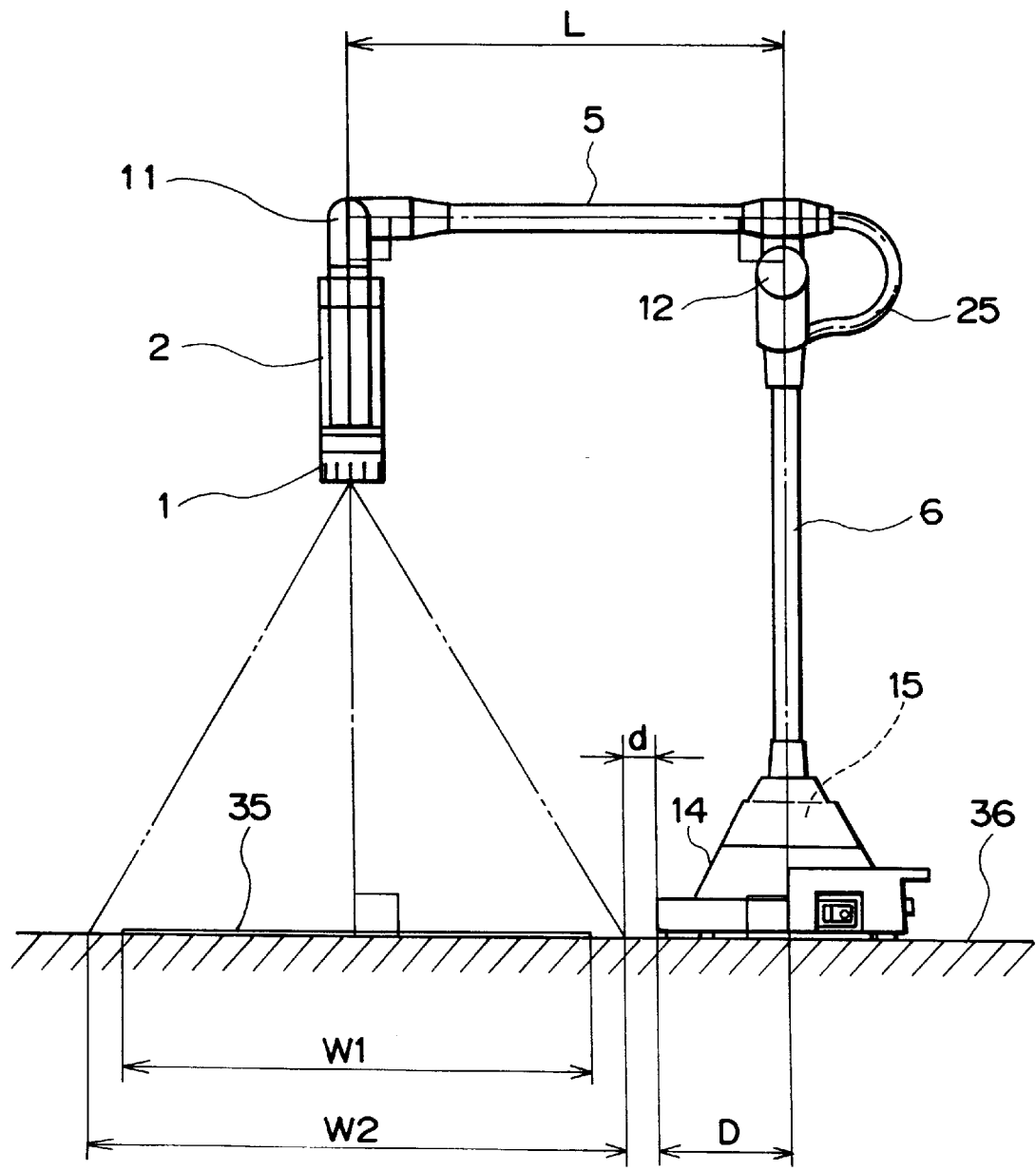
FIG. 4 is a schematic side view for explaining a document photographing mode in the embodiment of the present invention.

FIG. 4 is a side view of the apparatus in the document photographing mode. The apparatus main body and the original 35 are placed on a placing surface 36 of, e.g., a desk. In FIG. 4, the camera head 2 and the arm 5, the arms 5 and 6, and the arm 6 and the placing surface 36 roughly form right angles therebetween. In this form or posture, an image of the entire original 35 can be fully displayed on the screen of the monitor 33, and for example, in this embodiment, the original size at that time is set to be A4 size. Reference symbol L in FIG. 4 denotes the interval between the hinges 11 and 12; D, the radius of the main body base 14 having a substantially circular shape; W1, the width of the original 35; W2, the photographing range of the CCD; and d, the interval between the original 35 and the main body base 14. Since other reference numerals denote the same parts as in the above description, a detailed description thereof will be omitted.

Figure 5:
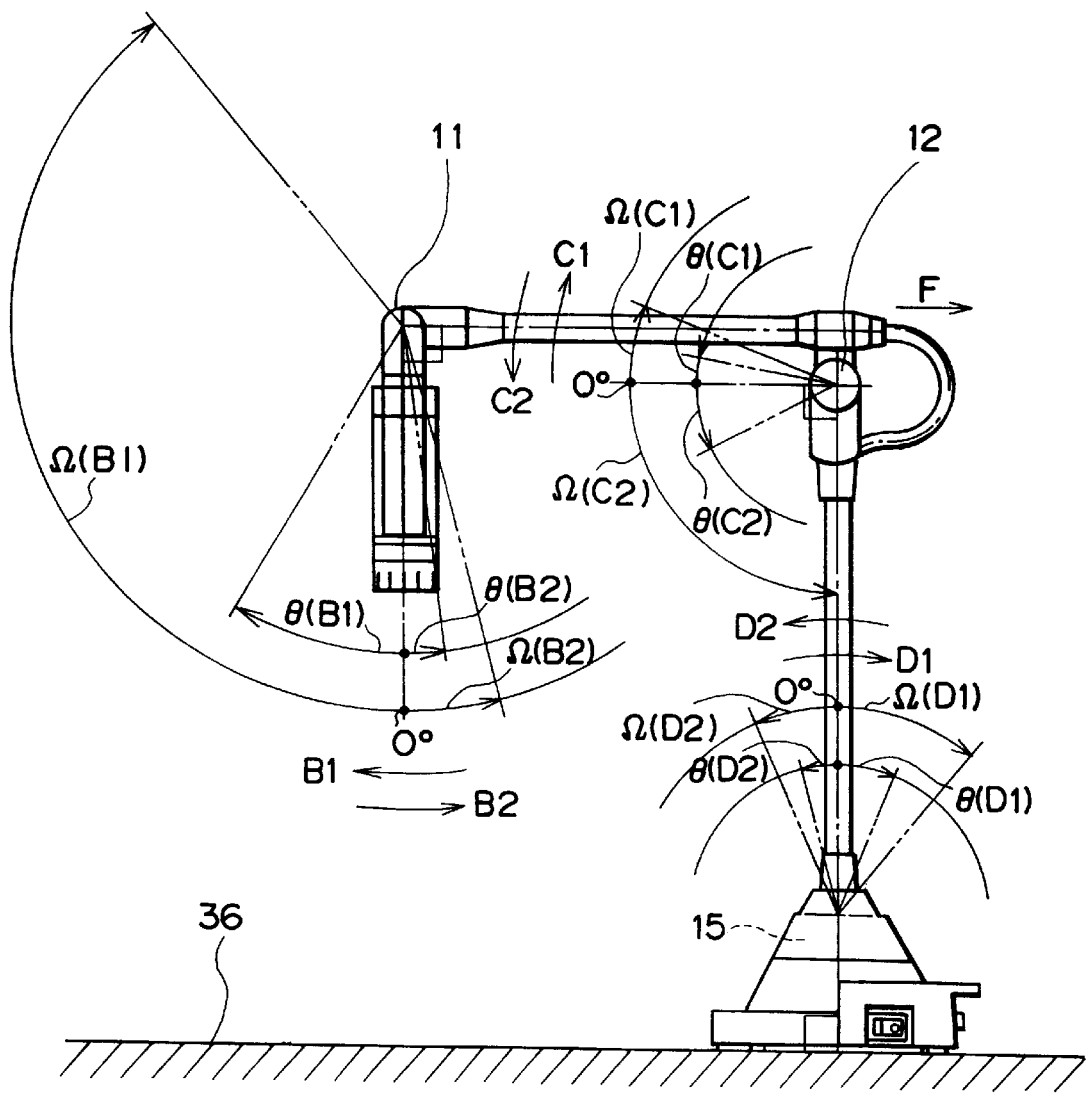
FIG. 5 is a schematic side view for explaining the pivotal motion of a hinge in the embodiment of the present invention.
Figure 6:
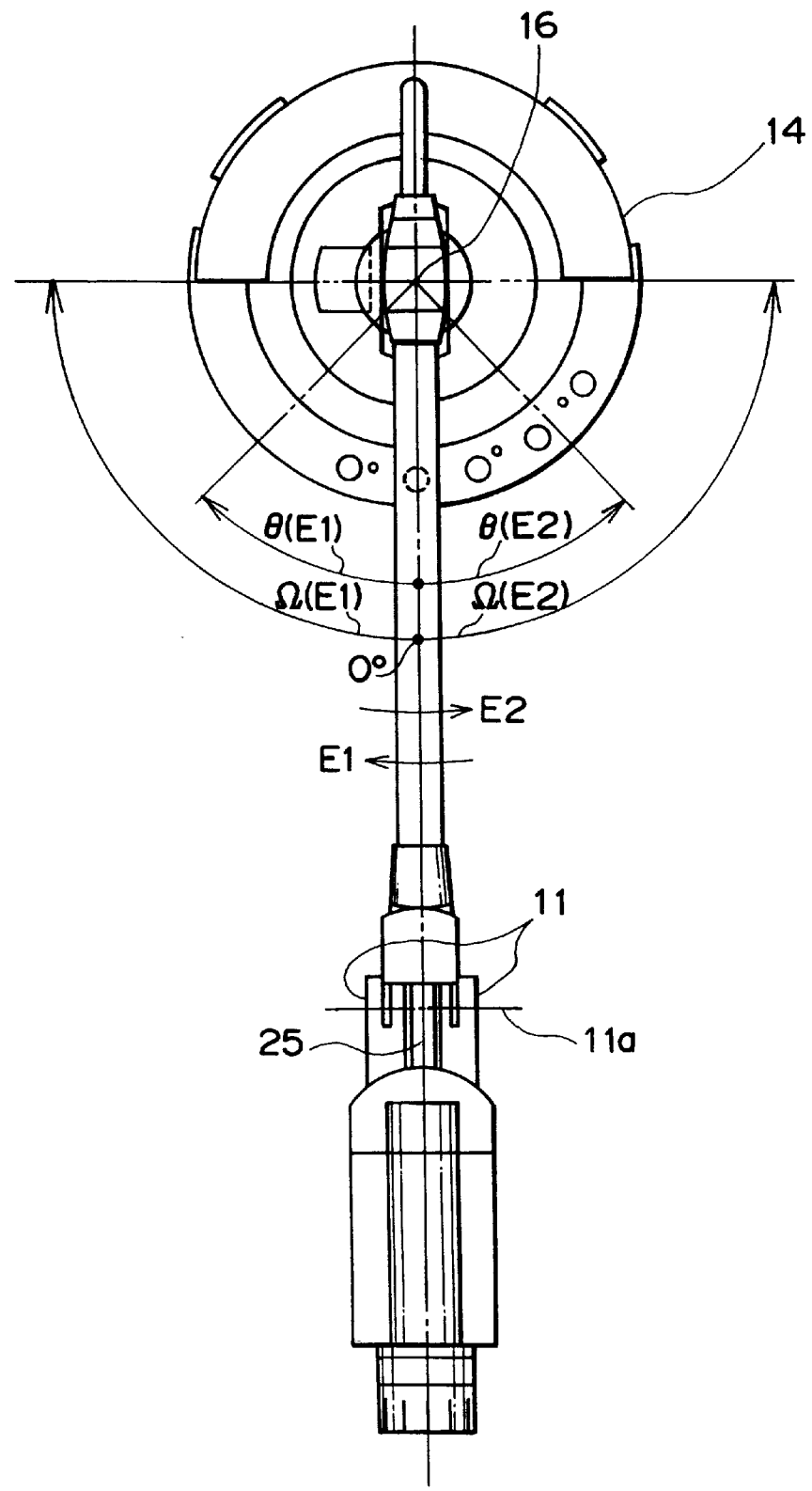
FIG. 6 is a schematic top view for explaining the pivotal motion of the hinge in the embodiment of the present invention.
Figure 7:
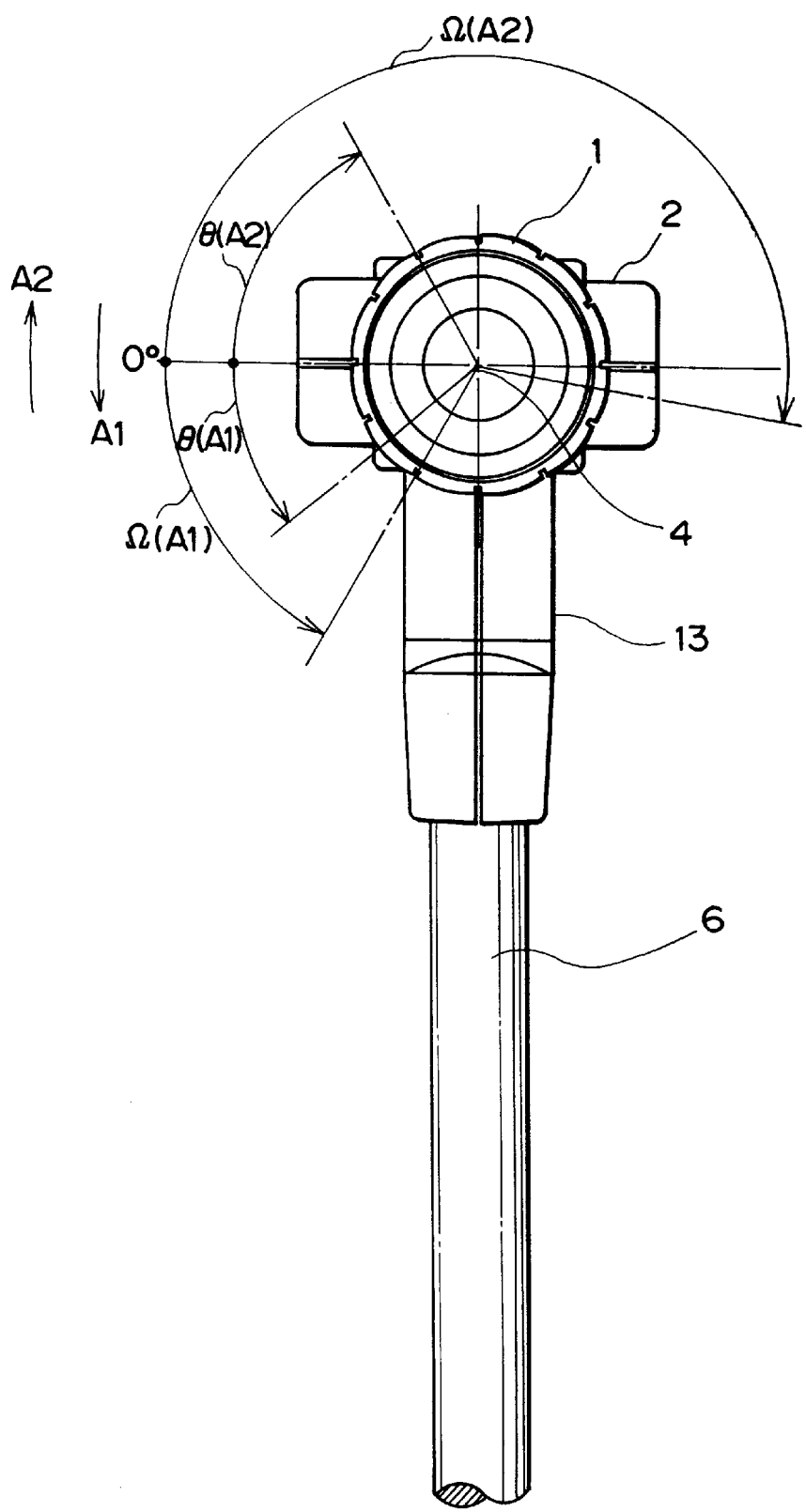
FIG. 7 is a schematic front view for explaining the pivotal motion of the hinge in the embodiment of the present invention.

FIGS. 5, 6, and 7 show preferred examples of the pivot angles of the respective hinges and pivot portions. FIG. 5 is a side view showing the pivot ranges of the hinges 11, 12, and 15, FIG. 6 is a top view showing the pivot range of the second pivot portion 16, and FIG. 7 is a view showing the pivot range of the first pivot portion 4 when viewed from the lens 1 side. Note that FIG. 7 illustrates a state wherein the camera head 2 is set in a horizontal state by pivoting it via the hinge 11 in the document photographing mode shown in FIG. 4.

In FIGS. 5 to 7, an angle , indicates the pivot angle of each of the hinges and pivot portions with reference to the state shown in FIG. 4. Since other reference numerals denote the same parts as in the above description, a detailed description thereof will be omitted. As will be described later, each hinge has a stopper for regulating its pivot angle, and examples of the maximum pivot angle, $\Omega$, set by the stopper are as follows:

$\Omega(A1)=60°$, $\Omega(A2)=190°$
$\Omega(B1)=140°$, $\Omega(B2)=15°$
$\Omega(C1)=20°$, $\Omega(C2)=90°$
$\Omega(D1)=40°$, $\Omega(D2)=24°$
$\Omega(E1)=180°$, $\Omega(E2)=180°$ Note that each of the hinges and pivot portions generates a holding torque required for holding the pivot angle against its weight. The holding torque to be generated is set to be a value that can prevent the camera head 2 from dropping by its weight independently of the angle of the hinge.

Figure 8:
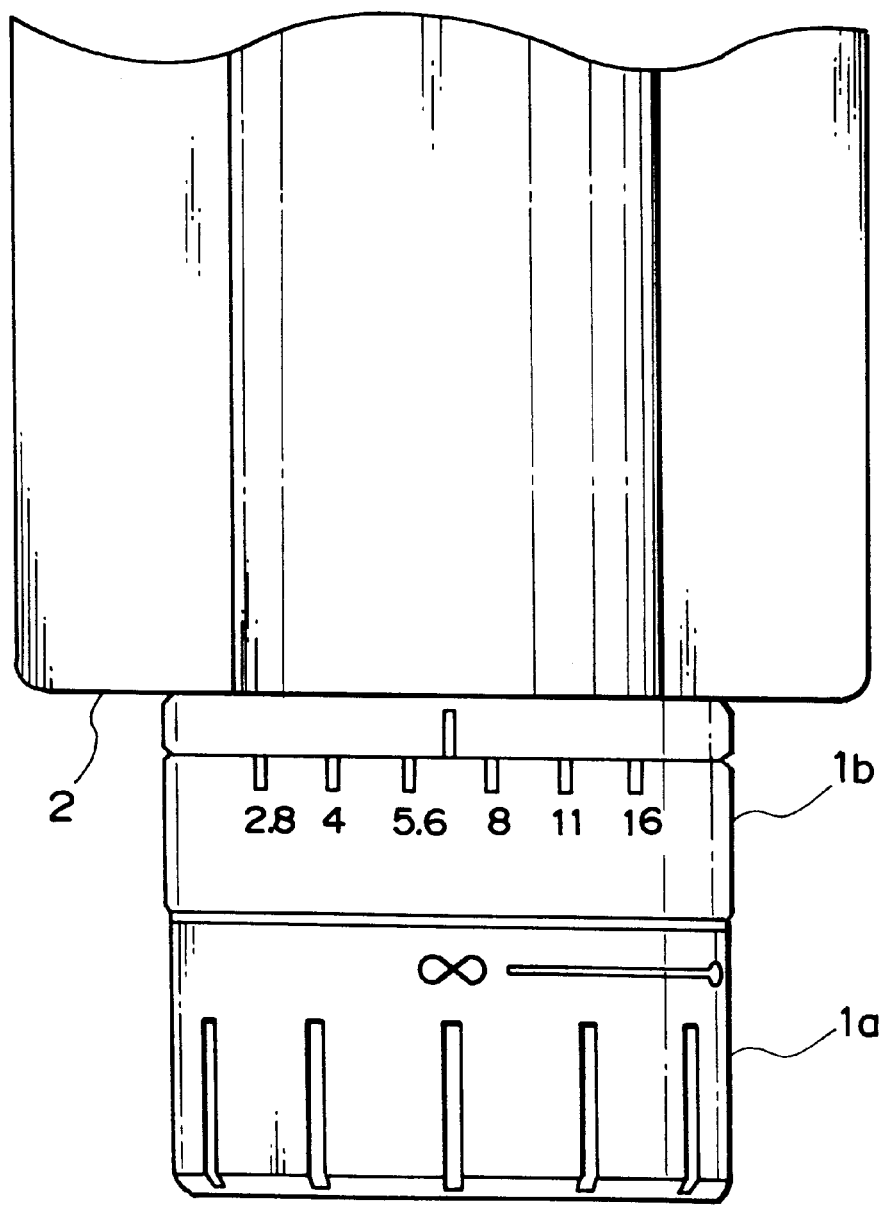
FIG. 8 is a schematic top view for explaining a lens portion in the embodiment of the present invention.

FIG. 8 is a partial enlarged view of the upper surface of the lens 1. The focus adjustment ring 1a preferably consists of hard rubber, and is formed with embossed indices for focus adjustment. Since the ring 1a consists of rubber, even when the lens 1 collides against the placing surface during the operation, the ring 1a can absorb the shock, and can prevent the lens 1 and the CCD and circuit board incorporated in the camera head 2 from being damaged. On the other hand, aperture values are, for example, printed on the aperture adjustment ring 1b.

Furthermore, both the focus adjustment ring 1a and the aperture adjustment ring 1b have another set of such indices at a position opposite to the above-mentioned indices through 180°. That is, when viewed from the back surface side of the plane of the drawing of FIG. 8, the same indices as those shown in FIG. 8 are seen.

Since the torque required for pivoting each of the focus adjustment ring 1a and the aperture adjustment ring 1b is set to be smaller than the pivot torque of the first pivot portion 4, the camera head 2 can be prevented from being rotated upon pivoting the ring 1a or 1b.

Figure 9:
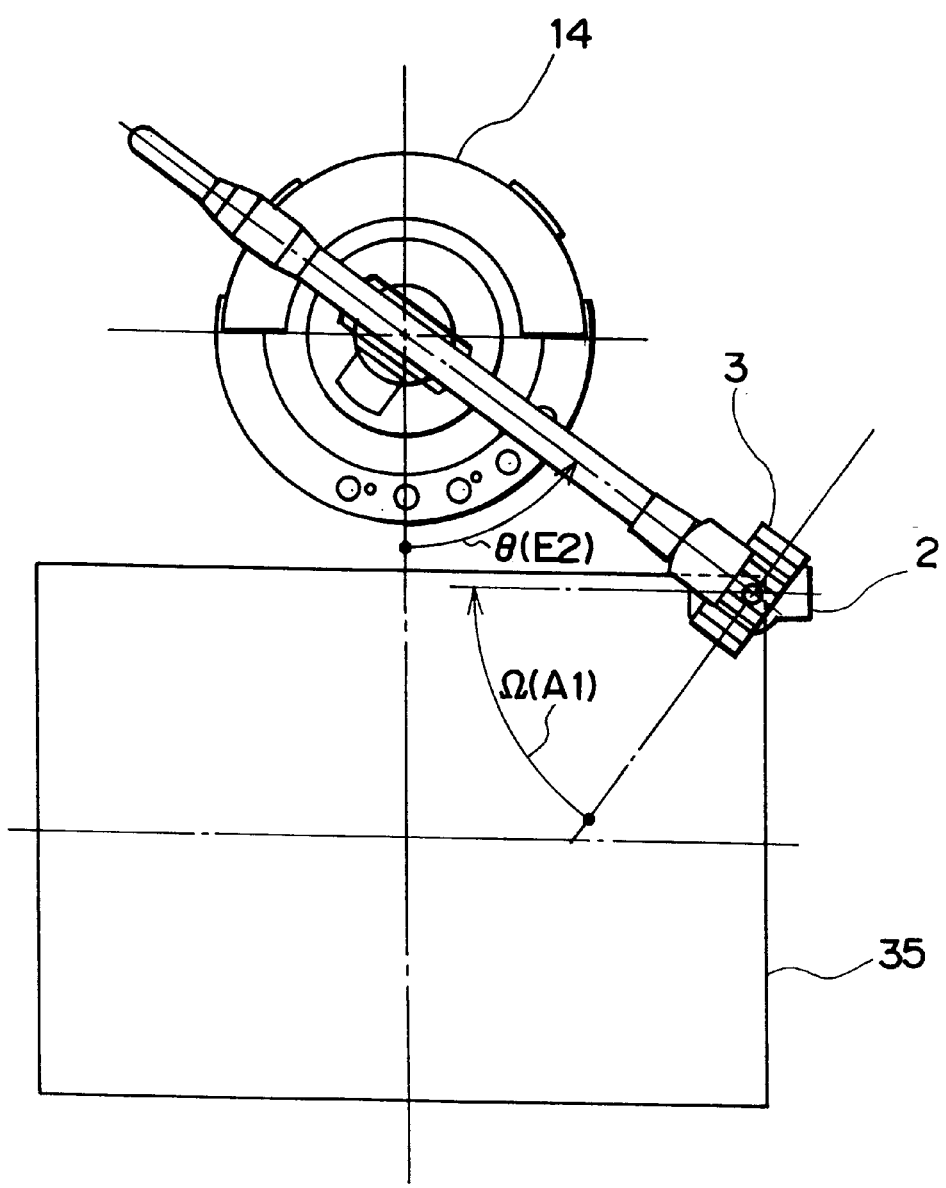
FIG. 9 is a schematic top view for explaining an original peripheral portion photographing operation in the embodiment of the present invention.

FIG. 9 is a top view showing the pivot state of the camera head 2 when a portion of the original 35 is to be photographed in an enlarged scale. Since the same reference numerals in FIG. 9 denote the same parts as in the above description, a detailed description thereof will be omitted.

Figure 10:
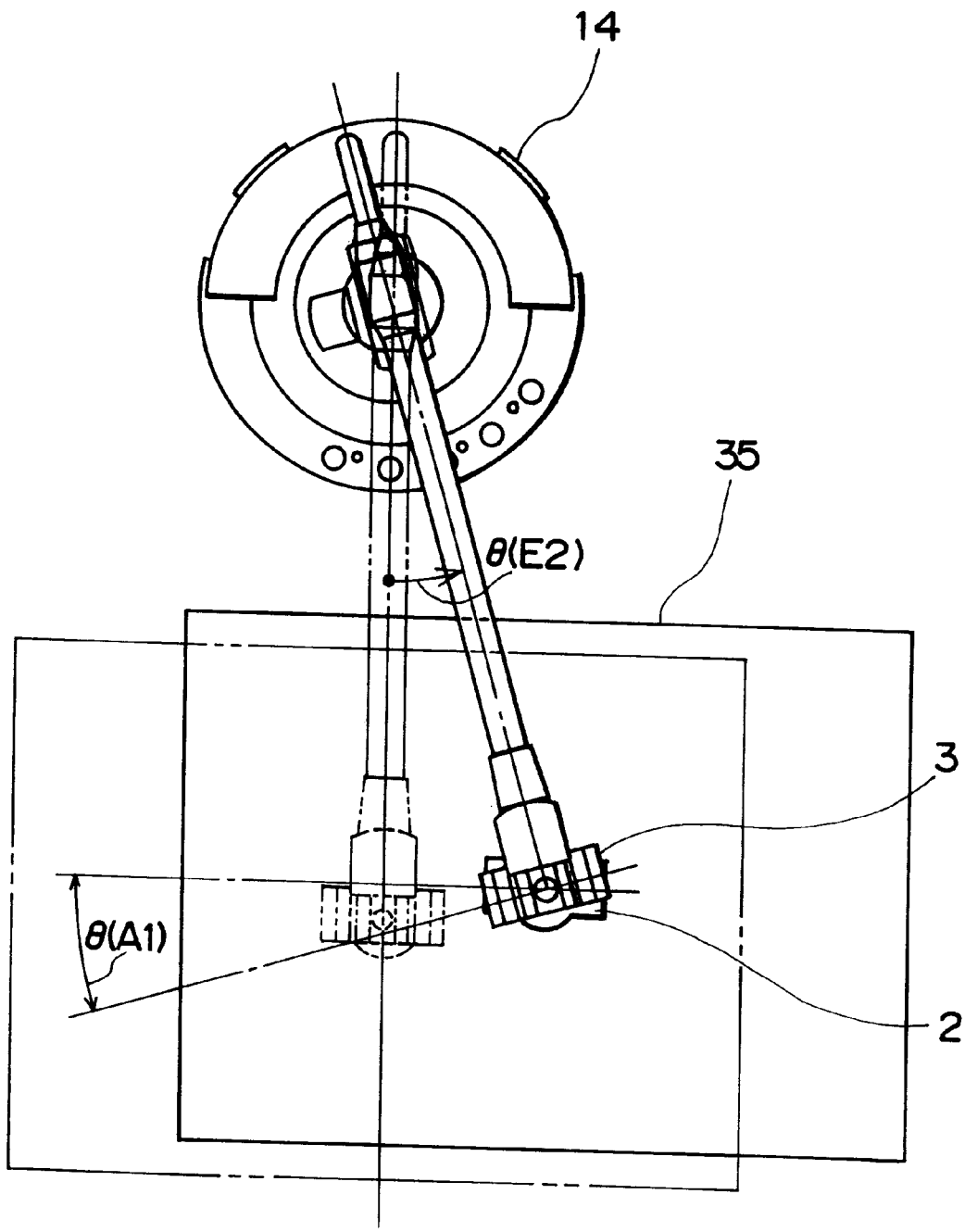
FIG. 10 is a schematic top view for explaining an offset original portion photographing operation in the embodiment of the present invention.

FIG. 10 is a top view showing the pivot state of the camera head 2 when the original 35, which is placed at a position offset from the central axis of the main body base 14, is to be photographed. Since the same reference numerals in FIG. 10 denote the same parts as in the above description, a detailed description thereof will be omitted.

FIG. 11 is a side view showing an example of the form used when an object such as a person is photographed in the horizontal direction.

Figure 12:
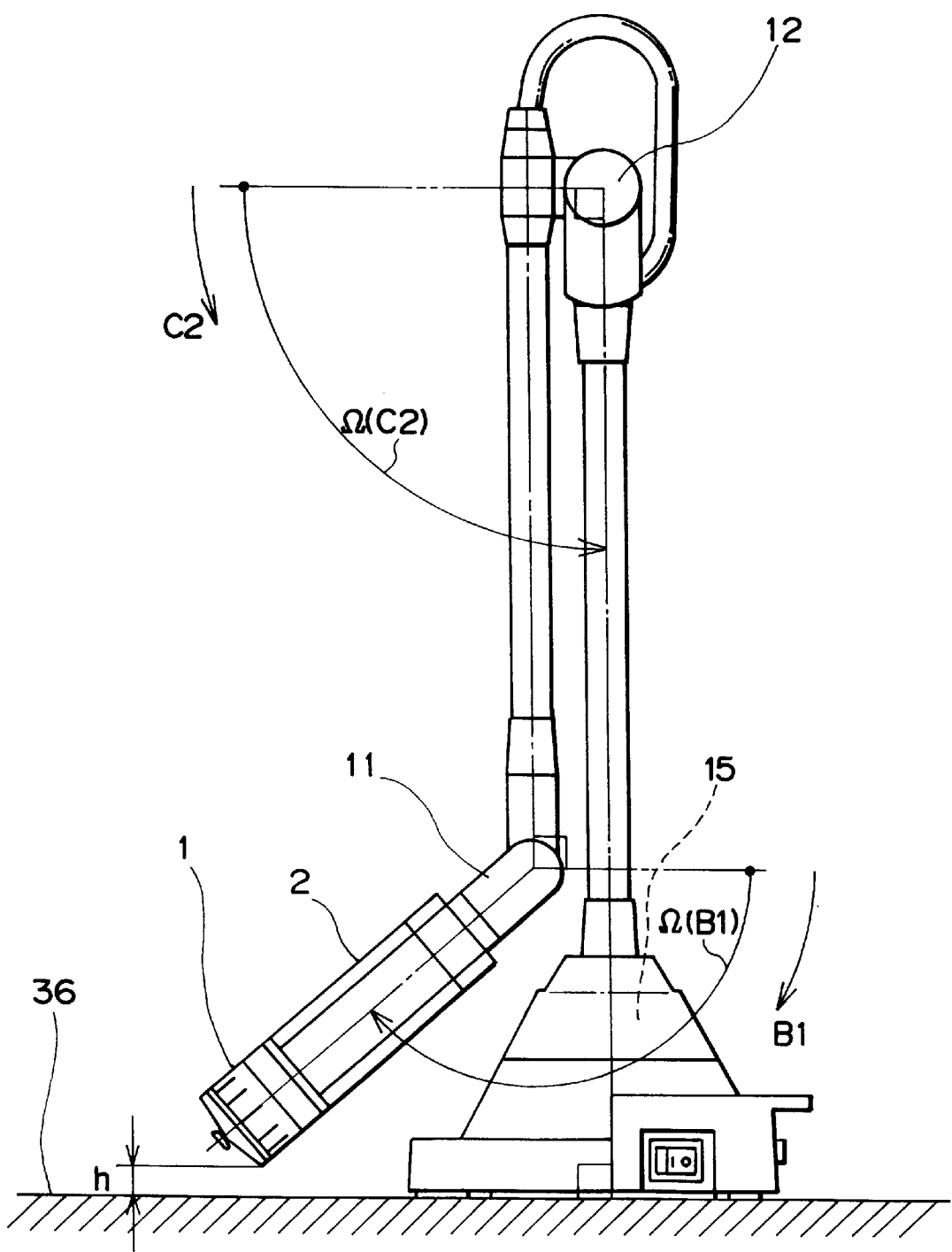
FIG. 12 is a schematic side view for explaining the carrying form in the embodiment of the present invention.

FIG. 12 is a side view showing an example of the form used when the apparatus is to be carried or stored. Reference symbol h in FIG. 12 denotes the distance between the distal end of the lens 1 and the placing surface 36.

Figure 13:
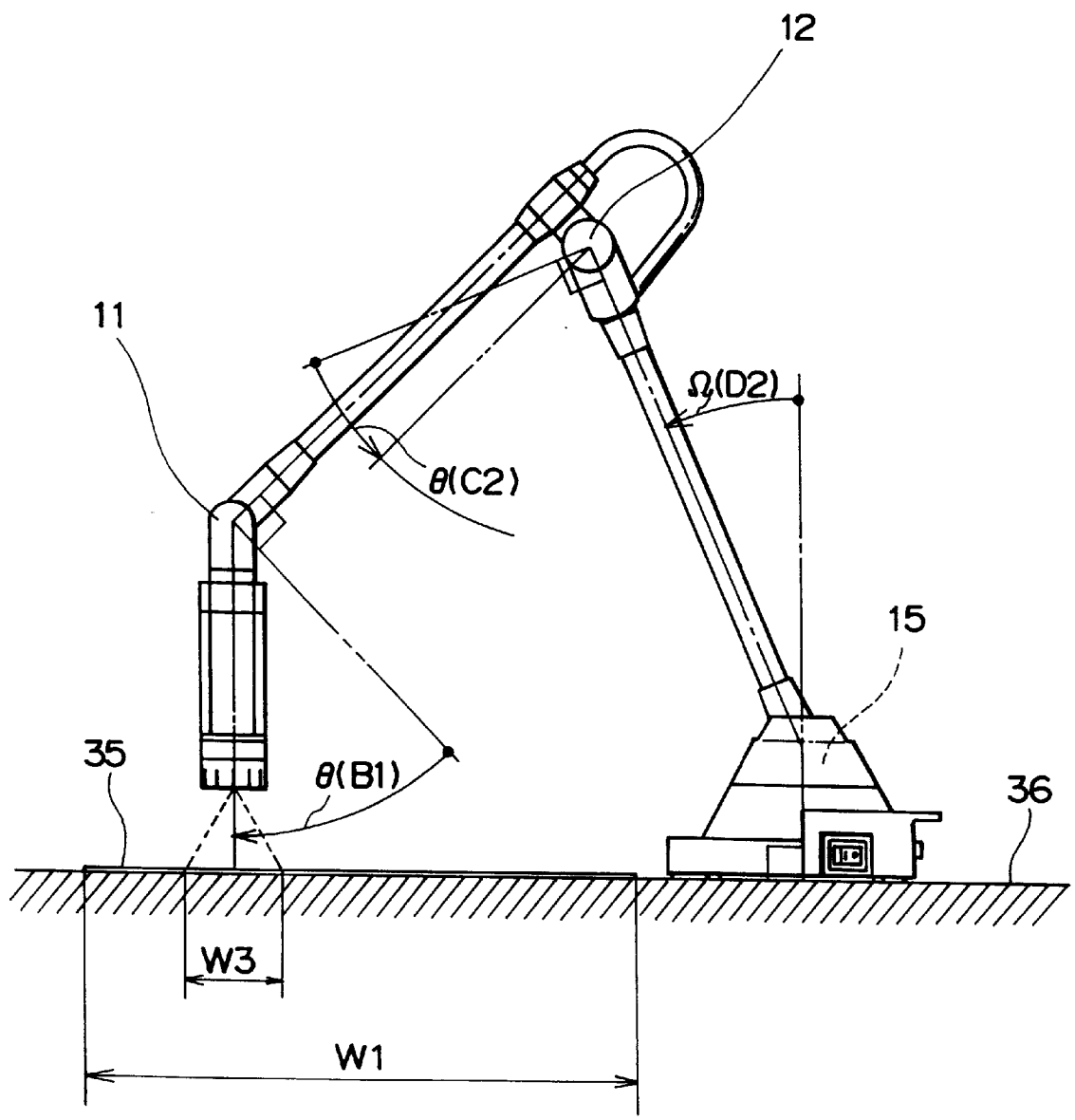
FIG. 13 is a schematic side view for explaining a partial enlarged-scale photographing operation in the embodiment of the present invention.

FIG. 13 is a side view showing an example of the form of the apparatus when a portion of the original 35 is photographed in an enlarged scale. Reference symbol W1 in FIG. 13 denotes the width of the original 35, as described above; and W3, the range to be photographed in the enlarged scale.

Figure 14:
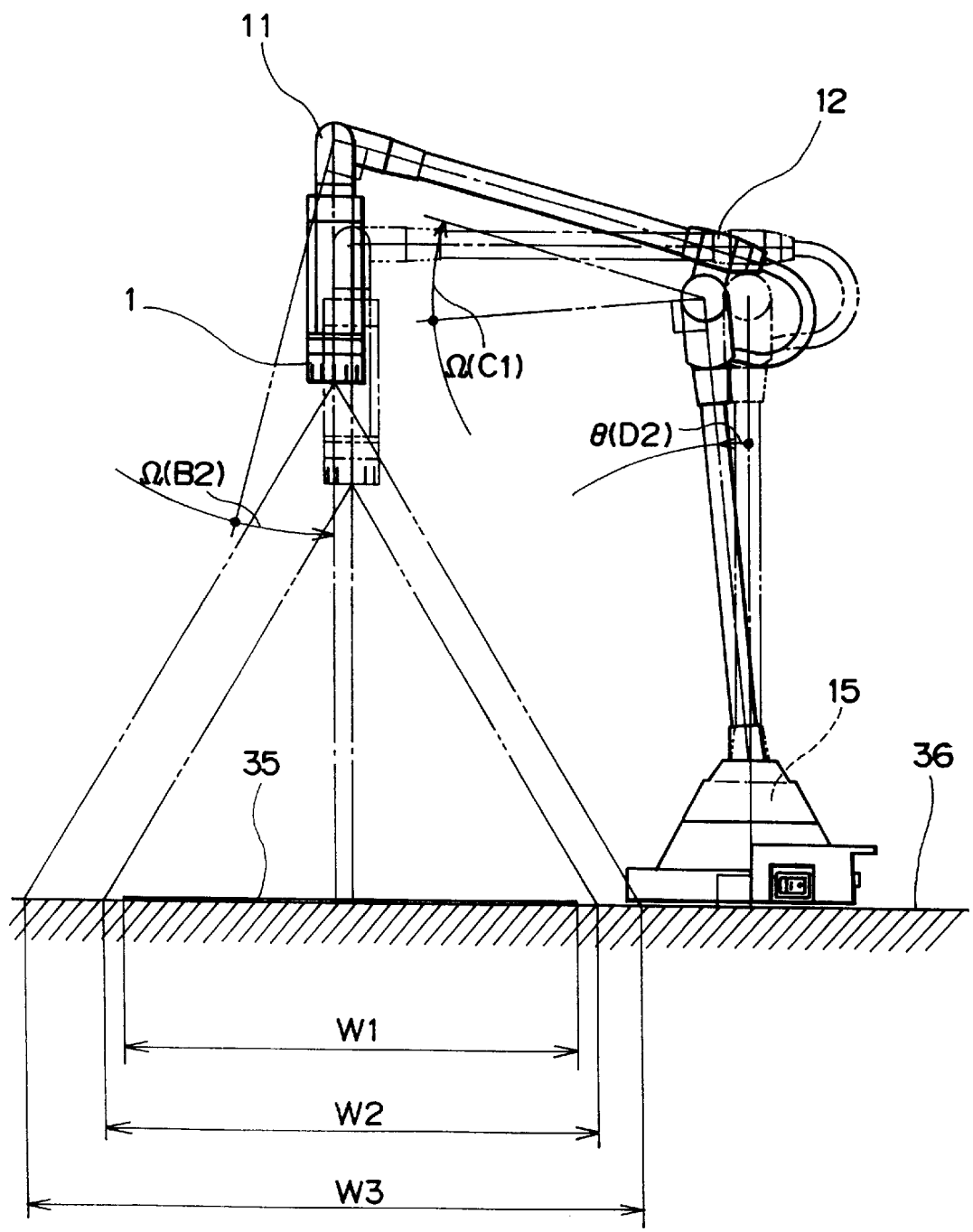
FIG. 14 is a schematic side view for explaining a large-size original photographing operation in the embodiment of the present invention.

FIG. 14 is a side view showing an example of the form of the apparatus when an original larger than the original 35 with a standard size is entirely photographed. The form indicated by an alternate long and two short dashed line in FIG. 14 corresponds to that of the apparatus when the A4-size original 35 is to be photographed as in FIG. 4. Reference symbols W1 and W2 in FIG. 14 respectively denote the width of the original 35 and the photographing range of the CCD, as has been described above with reference to FIG. 4; and W3, the enlarged photographing range.

Figure 15:
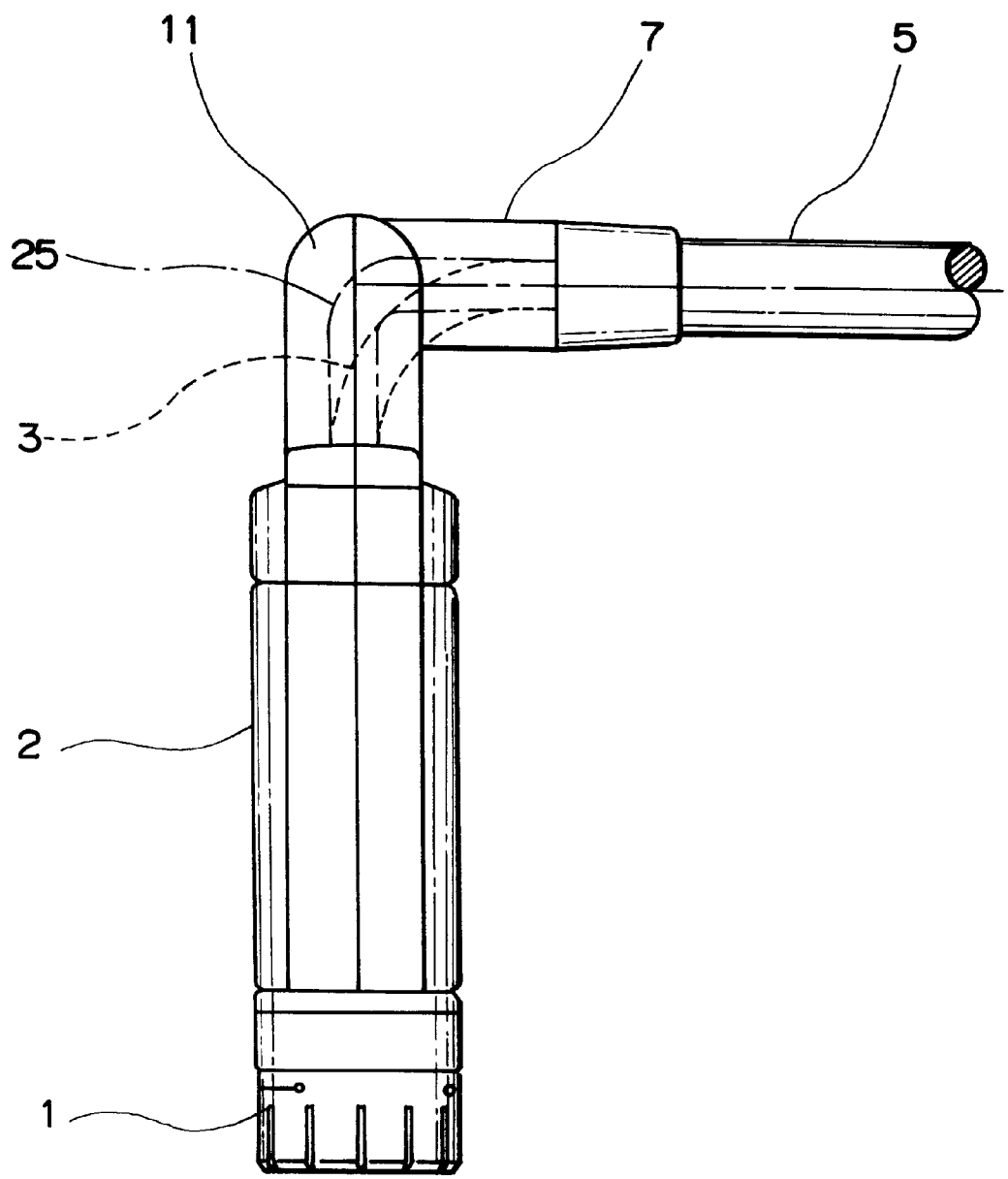
FIG. 15 is a schematic side view for explaining the bent state of a cable in the embodiment of the present invention.

FIG. 15 shows the bent state of the main cable 25 upon pivoting the hinge 11. In FIG. 15, an alternate long and short dashed line indicates the shape of the main cable 25 which is not subjected to a slip treatment, and a broken line indicates the shape of the main cable 25 subjected to a slip treatment.

Figure 16:
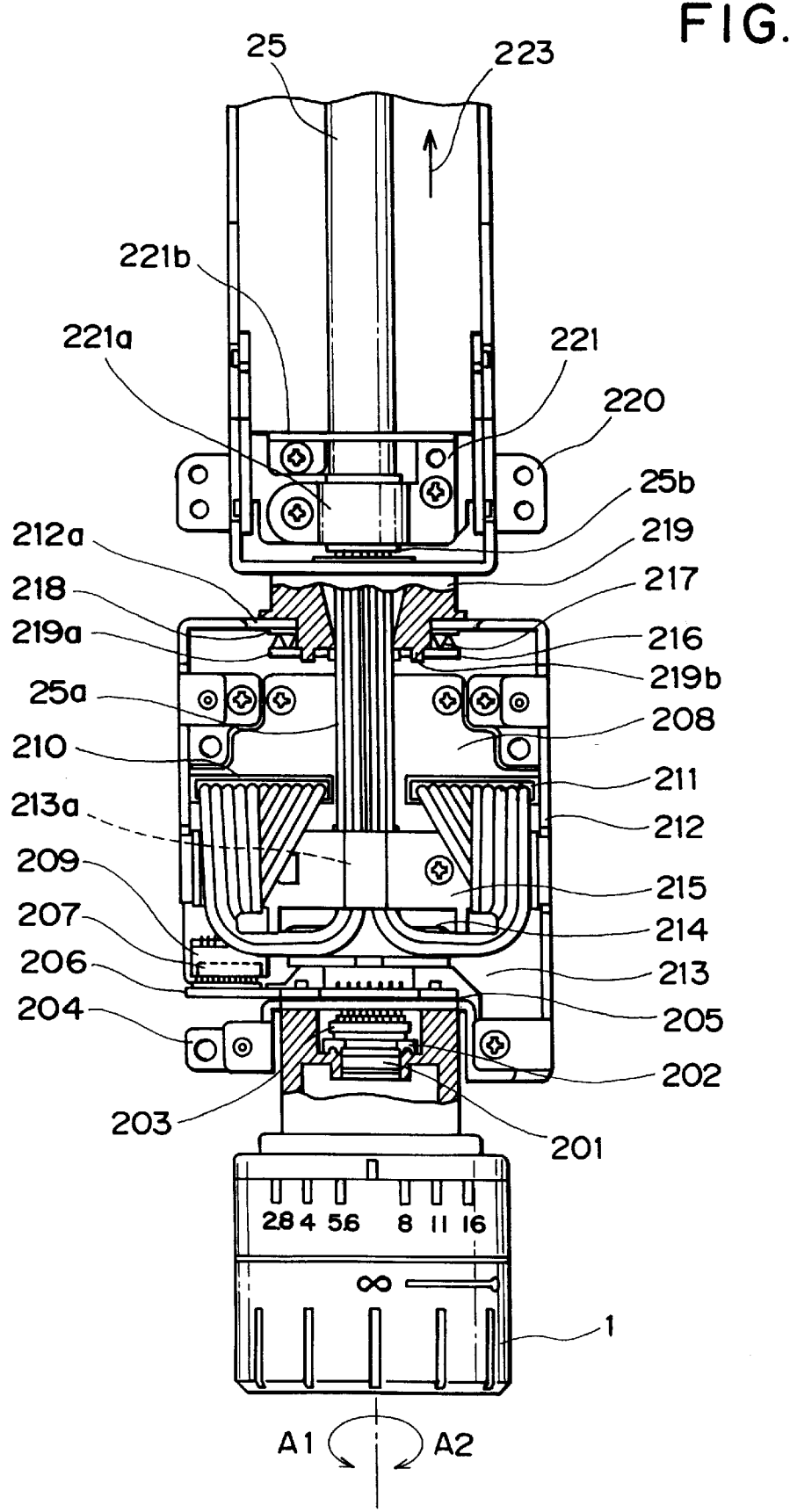
FIG. 16 is a schematic top view for explaining a camera head portion in the embodiment of the present invention.

FIG. 16 is a schematic top view for explaining the camera head 2. In FIG. 16, a camera case and a shield case are not shown. Referring to FIG. 16, reference numeral 201 denotes a substantially rectangular low-pass filter; 202, an elastic member which serves as a shock absorber upon clamping the low-pass filter 201 between a CCD 203 and the lens 1, and has a rectangular shape with a central square hole (the elastic member 202 preferably consists of silicone rubber in this embodiment, but the present invention is not limited to this material); 204, a lens chassis for holding the lens 1, a CCD circuit board 206, and a video circuit board 208; and 205, an insulating sheet for preventing the CCD circuit board 206 from contacting the lens chassis 204 to cause short-circuiting (the insulating sheet 205 preferably consists of vinyl chloride, but the present invention is not limited to this material as long as the sheet 205 can serve as an insulating member). The CCD 203 is fixed to the CCD circuit board 206 by soldering. A connector 209, which engages with a connector 207 on the CCD circuit board 206, and connectors 210 and 211, which engage with connectors of the main cable 25, are mounted on the video circuit board 208.

Reference numeral 212 denotes a head chassis, which has a round hole 212a that receives a head shaft 219 and a vertical plate 213, and is fixed to the lens chassis 204 at three bend portions by screws; and 214, a sheet which prevents signal lines 25a of the main cable 25 from touching the edge and the like of the lens chassis (the sheet 214 preferably consists of vinyl chloride in this embodiment, but the present invention is not limited to this), and is fixed to the vertical plate 213 by a double-sided tape adhered to its rear surface. Reference numeral 215 denotes a mold clamp for fixing the respective signal lines 25a at roughly the position of a groove portion 213a of the vertical plate 213; and 216, a head pan plate, which comprises a stopper 216a (to be described later; not shown in FIG. 16), is aligned by bosses 219a and 219b of the head shaft 219, and regulates the amounts of rotation of the head chassis 212 in the directions of the arrows A1 and A2 about the head shaft 219. The head pan plate 216 also serves as a regulating means for the deflection amount of a wave washer 217.

The wave washer 217 generates a torque upon rotation of the head chassis 212 in the directions of the arrows A1 and A2. Reference numeral 218 denotes a washer for improving slide feeling upon rotation of the chassis 212 (the material of the washer 218 and the slide feeling will be explained later). The head shaft 219 serves as a center upon rotation of the head chassis 212 in the directions of the arrows A1 and A2. Furthermore, reference numeral 220 denotes a tilt chassis; and 221, a metal clamp which has roughly a sawtooth-shaped portion at its one end so as to fix the main cable 25.

Figure 17:
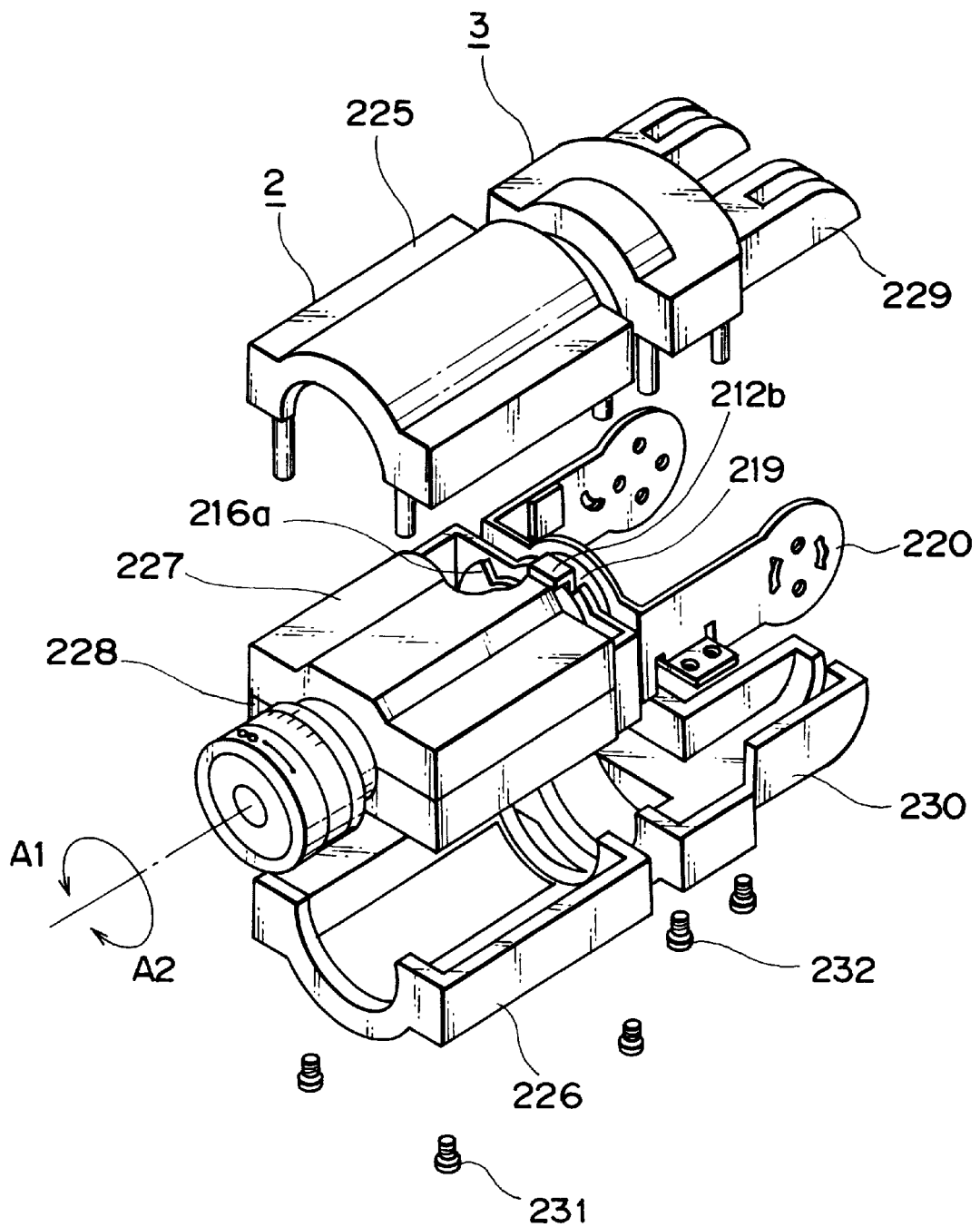
FIG. 17 is a schematic perspective view for explaining the camera head portion in the embodiment of the present invention.

FIG. 17 is a schematic perspective view for explaining the camera head 2. Referring to FIG. 17, reference numerals 225 and 226 denote camera cases fixed by screws 231; 227 and 228, shield cases; and 229 and 230, head base cases fixed by screws 232.

Figure 18:
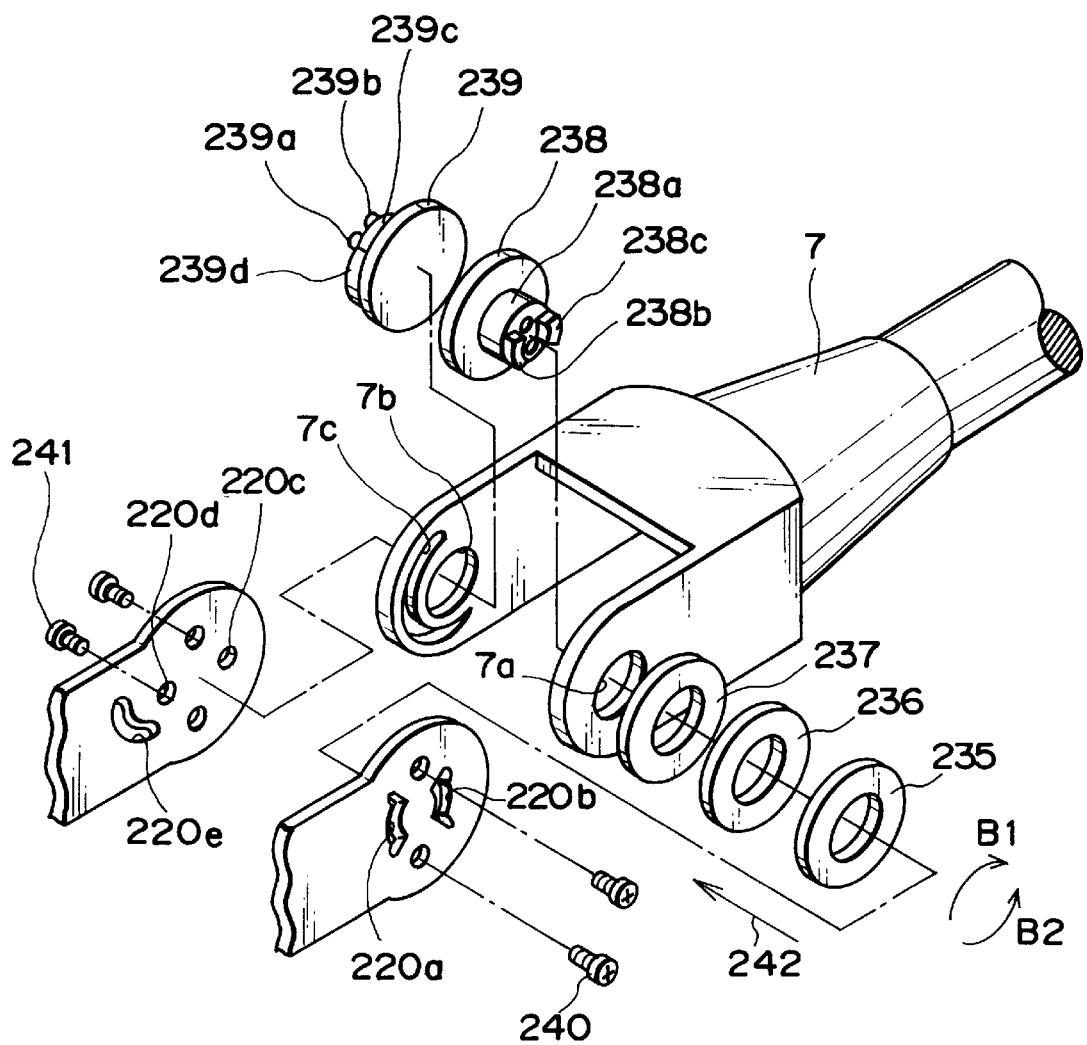
FIG. 18 is a schematic perspective view for explaining rotation of a head base in the embodiment of the present invention.

FIG. 18 is a schematic perspective view for explaining rotation of the head base 3 in the directions of the arrows B1 and B2. FIG. 18 does not illustrate the head base cases 229 and 230 constituting the head base 3, and the main cable 25. Referring to FIG. 18, reference numeral 235 denotes a belleville spring for generating a rotation torque; 236, a metal washer; 237, a slide washer; 238, a tilt shaft serving as the rotation shaft of the head base 3; and 239, a tilt shaft which serves as the rotation shaft of the head base 3, and regulates the rotation angle of the head base 3 by means of a groove 7c and a projection 239d.

Figure 19:
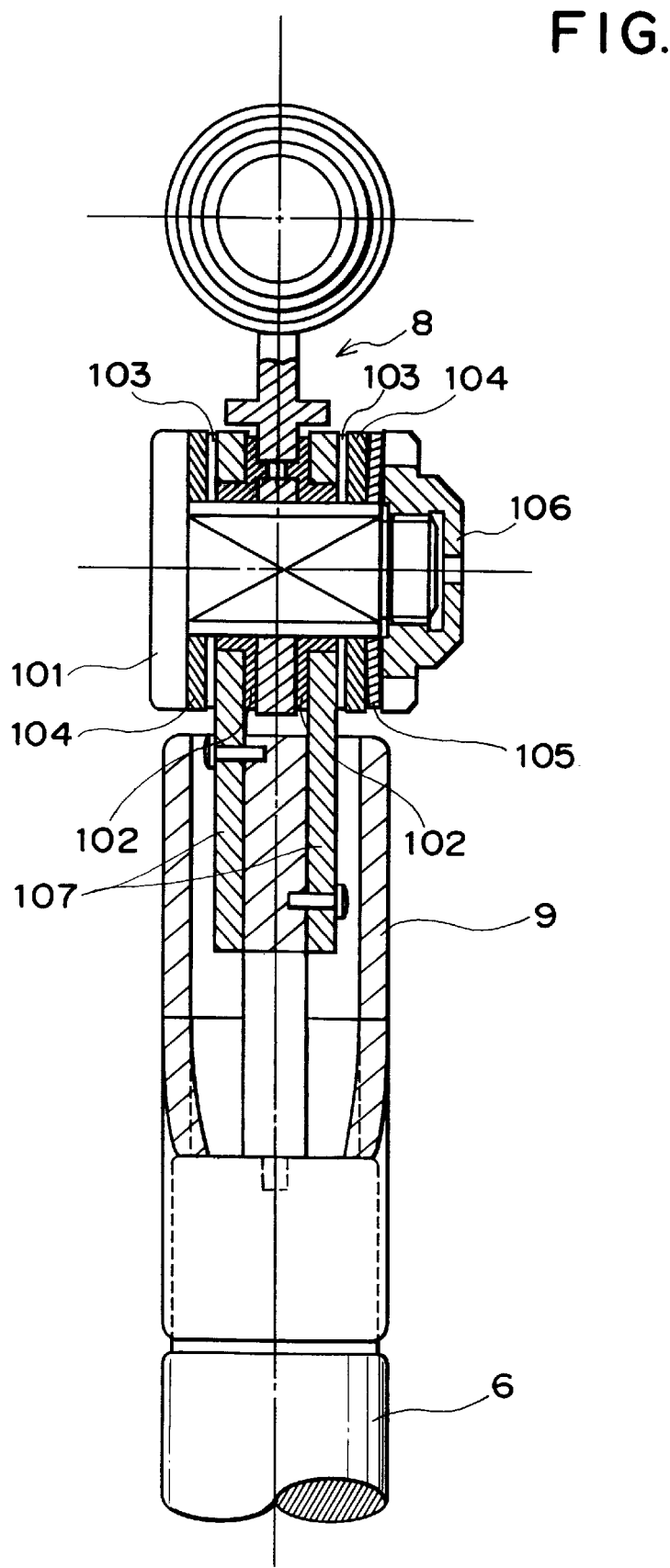
FIG. 19 is a schematic front sectional view for explaining a hinge portion according to the embodiment of the present invention.

FIG. 19 is a side sectional view the hinge 12. Note that FIG. 19 does not illustrate the outer case 13 and the main cable 25. Referring to FIG. 19, reference numeral 101 denotes a metal pivot shaft which is fitted into a D-cut hole (not shown) of the joint 8 and is rotated; 102, slide washers each of which consists of a resin material that has a high wear resistance and can be easily formed into an arbitrary shape; 103, slide sheets each of which is constituted by a metal plate; 105, a belleville spring; 106, a metal nut which threadably engages with the screw portion of the pivot shaft and compresses the belleville spring 105; and 107, support plates which pivotally and axially support the joint 8 and the pivot shaft and are fixed to the joint 9.

Figure 20:
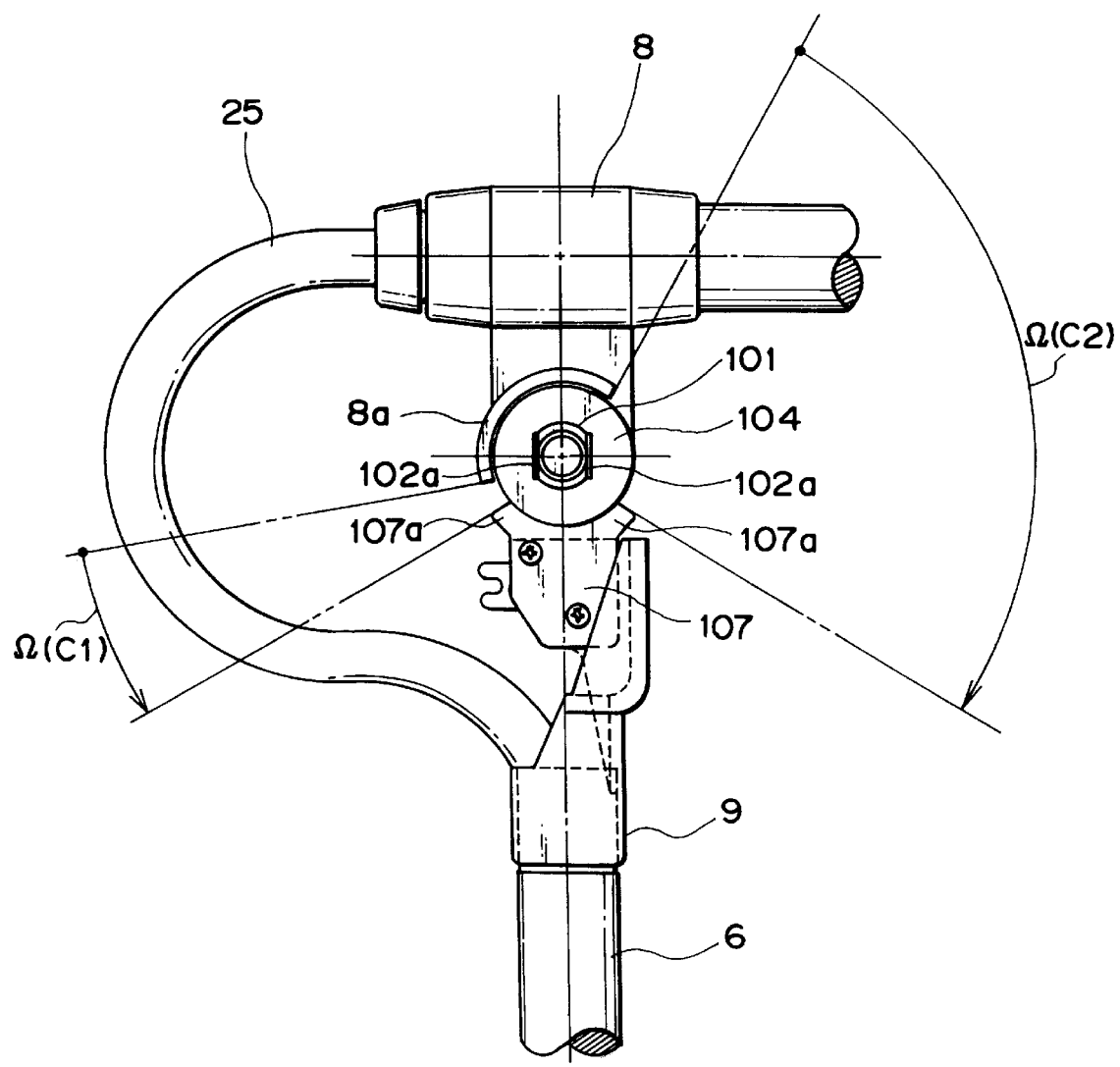
FIG. 20 is a schematic side view for explaining the hinge portion according to the embodiment of the present invention.

FIG. 20 is a side view of the hinge 12. FIG. 20 does not illustrate the nut 106 and the belleville spring 105. Referring to FIG. 20, the two surfaces of the pivot shaft 101 are D-cut. Also, the two side portions of the hole of each pivot washer 104 are D-cut, and the tongue-shaped extended portions 102a of the slide washer 102 are sandwiched between the pivot shaft 101 and the corresponding pivot washer 104. Each support plate 107 partially protrudes to form the projections 107a, and the arcuated rib portion 8a is formed on a portion of the joint 8.

Figure 21:
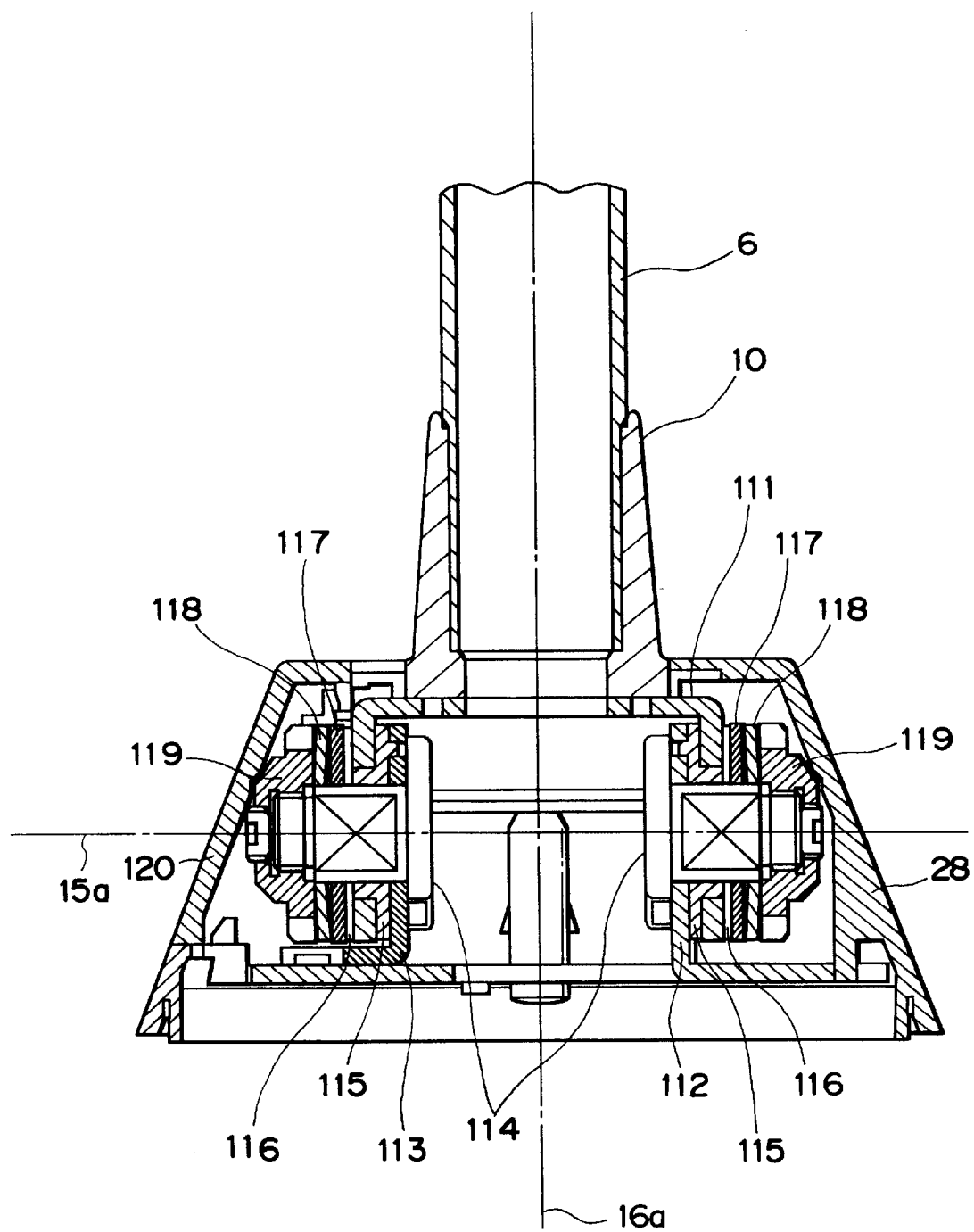
FIG. 21 is a schematic front sectional view for explaining the hinge portion according to the embodiment of the present invention.

FIG. 21 is a sectional view of the hinge 15. Referring to FIG. 21, reference numeral 111 denotes a pivot plate which is fixed to the joint 10 and is pivotal about the central axis 15a; 112, a base plate for pivotally supporting the pivot plate 111; 113, a base auxiliary plate which pivotally supports the pivot plate 111 as in the base plate 112, and is fixed to the base plate 112; and 114, metal support shafts axially support the pivot plate and are fitted in round holes formed in the base plate 112 and the base auxiliary plate 113. Although not shown, rotation stoppers are arranged between the support shafts 114, and the base plate 112 and the base auxiliary plate 113 to prevent the support shafts 114 from pivoting. Reference numeral 115 denotes slide washers each of which consists of a resin material that has a high wear resistance and can be easily formed into an arbitrary shape; 116, slide sheets each consisting of an ultra-high-molecular-weight polyethylene sheet with a high wear resistance; 117, stationary (or pivot) washers each constituted by a metal plate; 118, belleville springs; 119, metal nuts which threadably engage with the screw portions of the support shafts and compress the belleville springs; and 120, a blindfold cover which is locked by an elastic pawl formed on the hinge cover 28 and closes the opening portion of the hinge cover 28.

Figure 22:
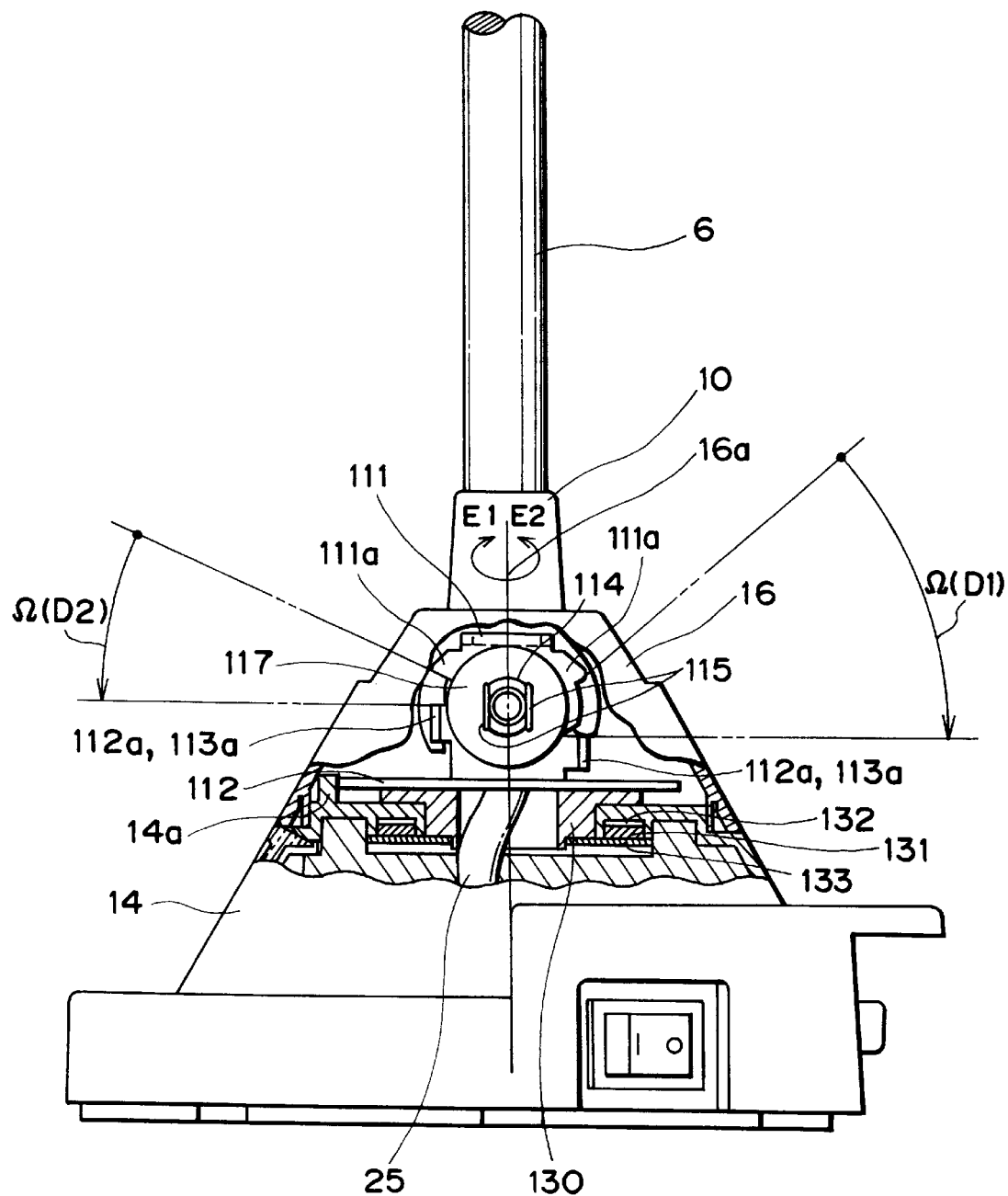
FIG. 22 is a schematic side sectional view for explaining the hinge portion according to the embodiment of the present invention.

FIG. 22 is a side view of the hinge 15 and a sectional view of the second pivot portion 16. FIG. 22 does not illustrate the nuts and the belleville springs. As shown in FIG. 22, the two surfaces of each support shaft 114 are D-cut. Also, the two side portions of the hole of each stationary washer 117 are D-cut, and the tongue-shaped extended portions 115a of the slide washers 115 are sandwiched between the support shafts 114 and the stationary washers 117. The pivot plate 111 partially protrudes to form the projections 111a, and the base plate 112 and the base auxiliary plate 113 are partially bent to form the tongue portions 112a and 113a.

Reference numeral 130 denotes a slide shaft which consists of a resin material with high slidability, and serves as the pivotal center of the second pivot portion 16, which pivots about the central axis 16a; 131, a wave washer for generating a torque upon pivotal motion; 132, a washer which consists of an ultra-high-molecular-weight polyethylene sheet for improving slidability; and 133, a metal pan plate which has a stopper, is positioned by a boss of the slide shaft 130, and regulates the pivot amount, in the directions of arrows E1 and E2, of the slide shaft 130 by its stopper. The pan plate 133 also serves as a regulating means for regulating the deflection amount of the wave washer 131.

Figure 23:
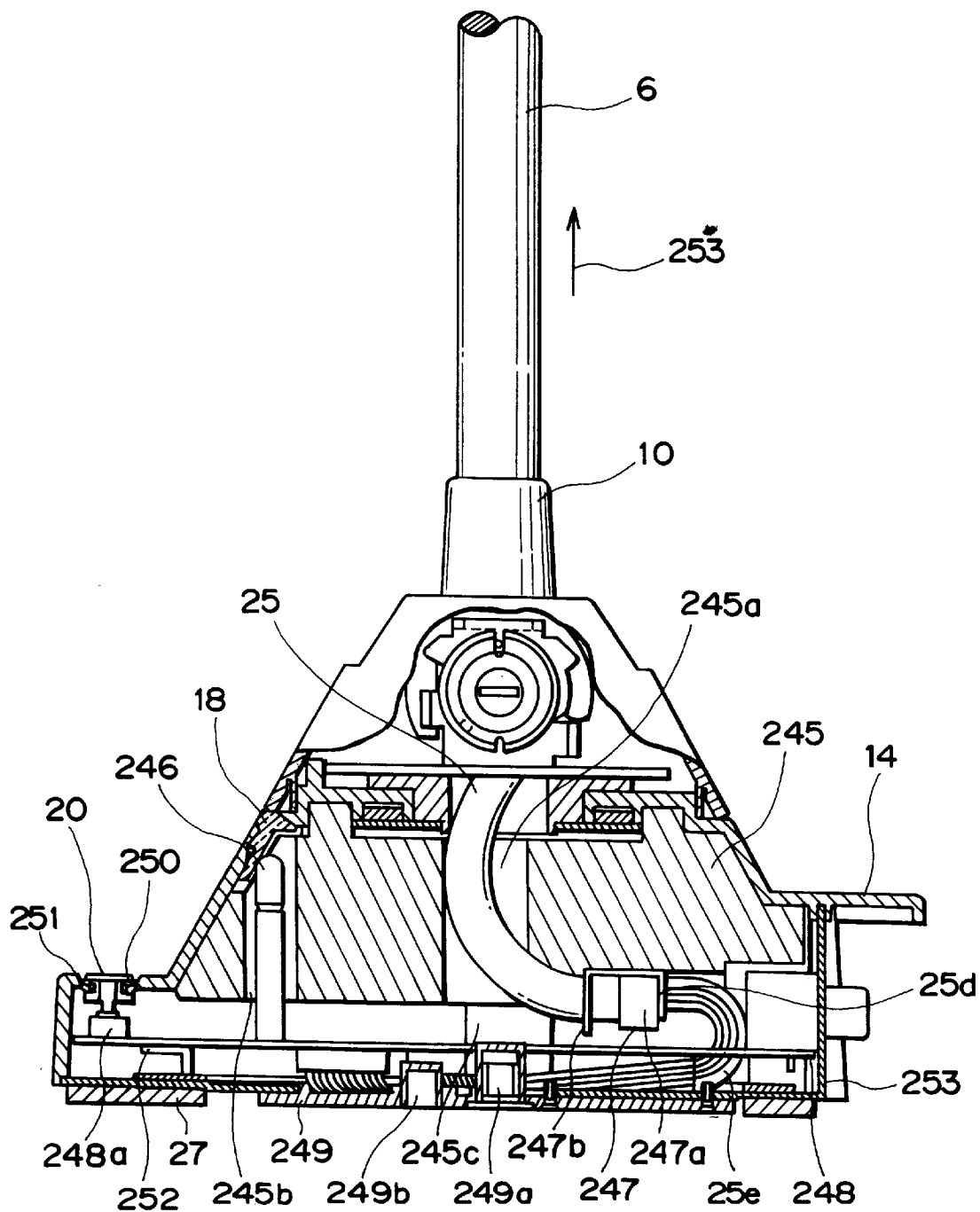
FIG. 23 is a schematic sectional view for explaining the internal structure of a main body base in the embodiment of the present invention.
Figure 24:
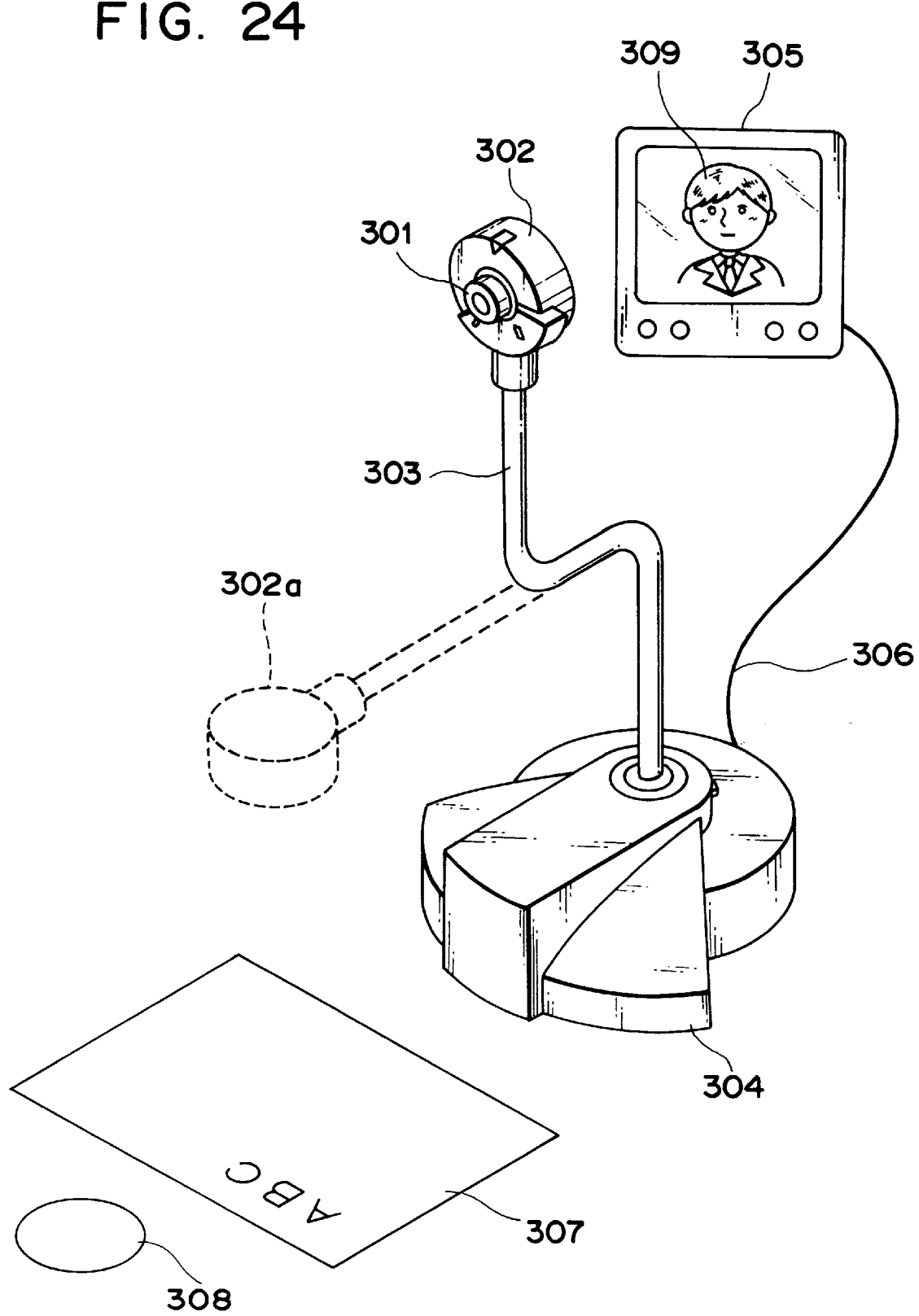
FIG. 24 is a schematic perspective view showing the prior art.
Figure 25:
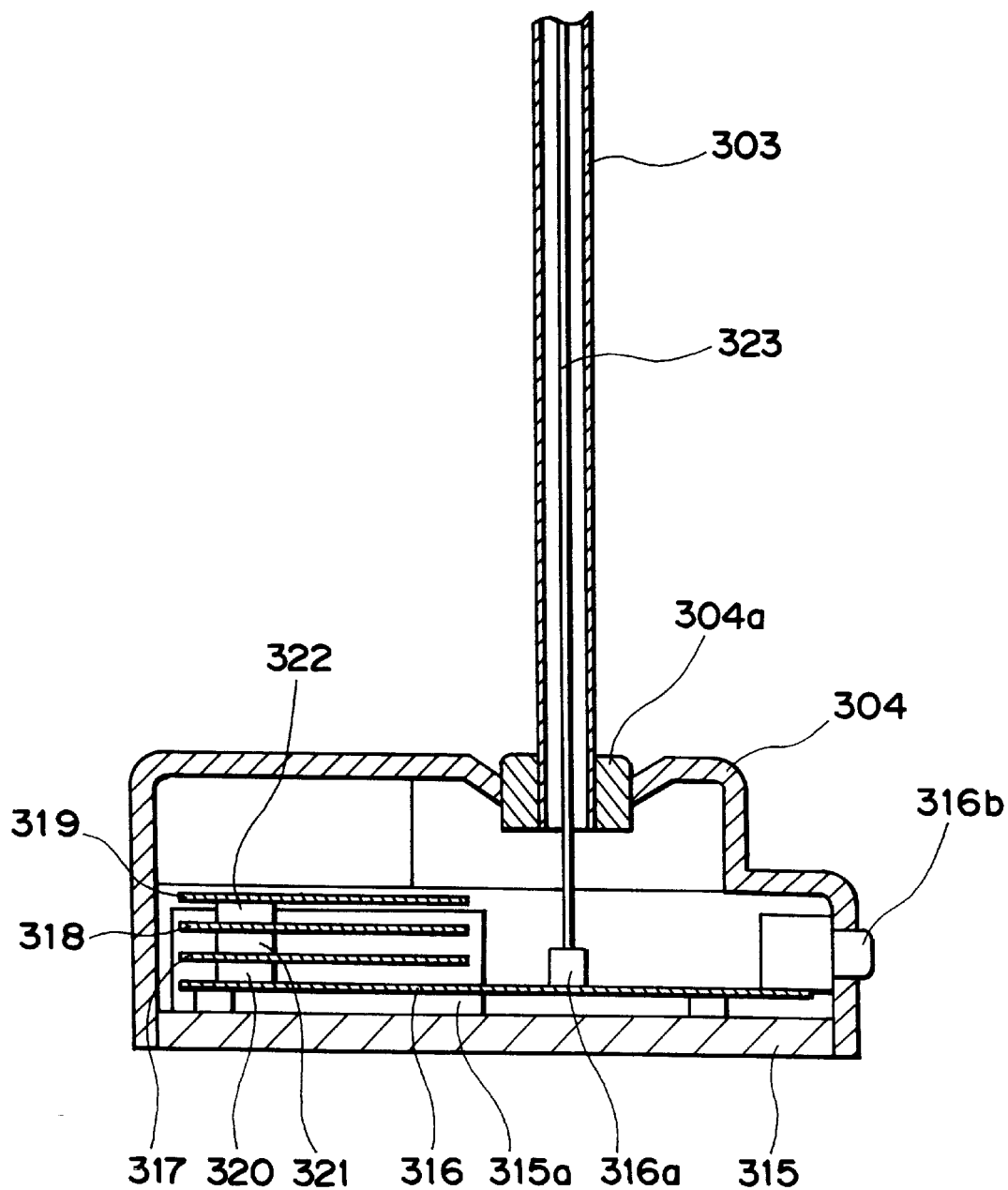
FIG. 25 is a schematic sectional view showing the prior art.

FIG. 23 is a schematic sectional view for explaining the internal structure of the main body base 14. Referring to FIG. 23, reference numeral 245 denotes a ballast which has roughly the same shape as the inner shape of the main body base 14, and is fixed to the main body base 14 by screws (not shown). The ballast 24 has a central hole 245a in which the main cable 25 is inserted, and a square hole 245b for a power LED on the front surface side, and serves as a weight for preventing the image input apparatus from falling down. Reference numeral 246 denotes a power LED which is turned on when the power supply is turned on; 247, a metal clamp for fixing the main cable 25 to the ballast 245; 248, a main circuit board formed with a hole in which the main cable 25 is inserted; and 249, a rear cover which has a screw portion 249a for a tripod and a hole 249b for receiving a rotation stopper pin, and serves as a cover for a square hole of a chassis 253 (to be described later).

Reference numeral 250 denotes a negative/positive selection switch button; 251, a coil spring for urging the negative/positive selection switch button 250 vertically upward; 252, a ring which is fitted into a groove portion formed on the negative/positive selection switch button 250 to prevent the switch button 250 from disengaging from the main body base 14 (in this embodiment, the ring 252 preferably consists of a resin sheet material having a C shape but may comprise a general E ring, or the like); and 253, a chassis to which the main circuit board is attached and which has a central square hole used for attaching/detaching a connector.

The operations of the image input apparatus with the above-mentioned arrangement will be described in turn below.

The basic signal processing flow will be described below with reference to FIG. 3. When the power switch 17 is turned on, light imaged on the CCD 203 via the lens 1 is converted into an electrical signal at predetermined time intervals. After the electrical signal is processed via the amplifier 54 and the image signal processing unit 51, the electrical signal is output as an image signal from the S output terminal 41 or the video output terminal 42. Then, an image is displayed on the monitor 33 connected to the apparatus via the connection cord 31.

When the microphone 34 is connected to the microphone input terminal 29, an electrical signal input from the microphone 34 is output to the audio output terminals 43 as stereophonic audio signals via the audio signal processing unit 52. Then, the stereophonic audio signals are output from the loudspeakers of the monitor 33 connected via the connection cord 32. Note that a monaural loudspeaker may be used although the realism deteriorates to some extent.

The operation performed when a document is to be photographed will be explained below. In this embodiment, A4 size as an original size which is most popularly used is assumed to be the standard original size. As shown in FIG. 1, an original 35 serving as an object is placed on the placing surface 36. At this time, the original 35 is positioned with reference to the power LED lens 18 of the main body base 14, so that the central line of the main body base 14 agrees with that of the original 35.

The angles defined by the camera head 2 and the arms 5 and 6 are set to be approximately 90°. In this embodiment, this setting state allows an image of the A4-size original 35 to be fully displayed on the monitor screen.

When the second pivot portion 16 is pivoted so that the index 28a of the hinge cover 28 matches the power LED lens 18, the camera head 2 is located at substantially the center of the original 35. That is, in the image input apparatus of this embodiment without any original table, the position of the original 35 to be placed is not easily determined. In view of this problem, in the apparatus of this embodiment, the power LED lens 18 of the main body base 14 is arranged at the center of the apparatus, and the original 35 is set with reference to the power LED lens 18, resulting in very good operability. Since an image of the standard, A4-size original 35 can be picked up by the above-mentioned simple operation, a need for cumbersome adjustments of the positions of the original and camera head while observing the image displayed on the screen of the monitor 33, can be obviated. Since the indication unit such as the power LED lens 18 for indicating the operation state of the apparatus is effectively utilized as an index or reference used for determining the position of the original 35 to be placed, the operability in the document photographing mode can be improved, and the apparatus can have a natural design.

Finally, the focus adjustment ring 1a of the lens 1 is rotated to adjust the focusing state, and thereafter, the camera head 2 is pivoted by the first pivot portion 4, thereby correcting any tilt of an image of the original 35 displayed on the screen of the monitor 33. After the original 35 is set as described above, its photographing operation is performed.

At this time, the positional relationship shown in FIG. 4 is established between the form of the apparatus and the original size. That is, when the angle formed between the camera head 2 and the arm 5, the angle formed between the arms 5 and 6, and the angle formed between the arm 6 and the placing surface 36 are respectively set to be about 90°, an image, in the landscape direction, of the A4-size original 35 can be fully displayed on the screen of the monitor 33. Furthermore, the interval d between the main body base 14 and the original 35 is set as follows to prevent an image of the main body base 14 from being displayed on the screen:

$$d = L - D - W2/2 > 0$$

In this embodiment, the standard original size is assumed to be A4 size. Of course, the present invention is not limited to this size.

As shown in FIG. 6, the hinge 11 is divided into two opposing portions on the two sides of the main cable 25, i.e., the main cable 25 crosses the central axis 11a of the hinge 11. With this structure, since the main cable 25 need not bypass the hinge 11, it can be naturally laid.

As shown in FIG. 5, when the pivot angle, θ(B1), of the hinge 11 is close to 0°, i.e., when the camera head 2 and the arm 5 form substantially right angles, the main cable 25 is also bent at right angles, and a large stress may locally act on the main cable 25, resulting in disconnection of the main cable 25. The bent shape of the main cable 25 is indicated by an alternate long and short dashed line in FIG. 15. In view of this problem, a resin tube or the like with high slidability is wound around a portion of the main cable so that the inner wall of the arm 5 and the main cable 25 can easily slide against each other. With such slide treatment, the main cable 25 slides in the direction of an arrow F in FIG. 5. As a result, since the main cable 25 forms a large arcuated shape (with a large radius of curvature), as indicated by a broken curve in FIG. 15, no local concentration of stress takes place, i.e., disconnection of the cable can be prevented. At this time, since the main cable 25 is bent outside the hinge 12, it easily slides in the direction of the arrow F.

In order to improve the slidability of the main cable 25, this embodiment uses a tube with high slidability. Alternatively, a lubricant such as grease may be used, or a paint with high slidability (e.g., fluorine paint) may be applied on the inner wall of the arm 5, thus achieving the same effect as described above.

The functions of various switches will be explained below.

AGC Switch 19

When the power switch 17 is turned on, the AGC function is automatically enabled, and the amplifier 54 operates in accordance with a signal from the CPU 50 (FIG. 3) so as to appropriately adjust the brightness of an image of the original 35 displayed on the monitor 33. However, a high-luminance portion, so-called "oversaturated image", may be generated depending on the ambient illumination, gloss of the original surface, and the like. In such a case, the aperture adjustment ring 1b of the lens 1 is opened. Then, the CPU 50 sets a minimum gain to lower the luminance since the object has a high luminance. At this time, when the AGC switch 19 is depressed, since the AGC switch 19 is a switch for fixing the gain at that time, the gain is fixed to be the minimum value. As the aperture adjustment ring 1b is stopped down, the luminance of the screen of the monitor 33 lowers. Thus, the operator can obtain an appropriate brightness by stopping down the aperture adjustment ring 1b while observing the image displayed on the screen of the monitor 33.

For example, when a person in front of a window as a background is to be photographed, the luminance of the background is often higher than that of the object, and the CPU 50 lowers the gain under the influence of the high luminance of the background, resulting in a dark image of the object. In such a case, the aperture adjustment ring 1b is stopped down to its limit. With this operation, since the CPU 50 sets a maximum gain, the operator depresses the AGC switch 19 at that time to fix the maximum gain. Then, the operator opens to the aperture adjustment ring 1b while observing the image displayed on the screen of the monitor 33 so as to obtain an appropriate brightness.

Note that an LED in the vicinity of the aperture adjustment switch is kept OFF since the apparatus is normally used with the AGC function ON. When the AGC function is disabled, i.e., when the gain is fixed, the LED is turned on.

WB (White Balance) Switch 22

When the operator wants to change the color tone of the image of the object displayed on the monitor 33, he or she depresses the WB switch 22. Upon depression of the switch 22, the CPU 50 supplies a signal to the image signal processing unit 51 to adjust white balance with respect to the object. While the white balance is adjusted, an LED in the vicinity of the WB switch 22 is caused to blink, thereby informing the operator that the white balance is being adjusted. Since the LED is turned off upon completion of the adjustment, the operator then turns the volume 23 to obtain a desired color tone.

In this embodiment, when the volume 23 is turned from the neutral position to the right, the image is tinged with blue; when the volume 23 is turned to the left, the image is tinged with red. That is, when the operator turns the volume 23, the CPU 50 detects the direction and amount of rotation from the neutral position, and determines the bluish or reddish tinge on the basis of the direction of rotation, and determines the amount of change in color tone on the basis of the amount of rotation. The CPU 50 supplies a signal to the image signal processing unit 51 to change the color tone with respect to an image signal supplied from the CCD.

Shutter Selection Switch 44

Since an illumination of, e.g., a normal fluorescent lamp is caused to repetitively blink at the frequency of a commercial power supply, when the blinking frequency of the illumination does not match the shutter speed of the CCD or does not correspond to an integer multiple of the shutter speed, an image flicker occurs. For example, in the Eastern Japan area such as Tokyo, since the frequency of the commercial power supply is 50 Hz, a flicker occurs if the shutter speed is 1/60 sec. In view of this problem, in this embodiment, the shutter speed can be selected from 1/60 sec and 1/100 sec, i.e., can be switched in correspondence with the frequency of the local commercial power supply. For example, in the case of Tokyo, the shutter speed is switched to 1/100 sec, thus preventing any flicker. At this time, the CPU 50 supplies a signal to the timing generator 53 in accordance with the state of the shutter selection switch 44 to control the shutter speed of the CCD.

Negative/Positive Reversal Switch 20

When a negative film of, e.g., a still picture is to be photographed, the negative film is placed on a light box serving as a light source, and the negative/positive reversal switch 20 is depressed. The CPU 50 then supplies a signal to the image signal processing unit 51 to perform predetermined processing of an image signal supplied from the CCD, thereby reversing a negative image to a normal positive image, and outputting the positive image.

Microphone Mute Switch 21

For example, when the apparatus of the present invention is used in a video meeting system, the voice of the operator is input using the external microphone 34. When the operator wants to temporarily disable the voice input, he or she depresses the microphone mute switch 21. Then, the CPU 50 supplies a signal to the audio signal processing unit 52 to stop the output of audio signals to the audio output terminals 43. At this time, since an LED in the vicinity of the microphone mute switch 21 is turned on, the operator can easily recognize that the voice input is disabled. On the other hand, when the operator wants to input his or her voice again, he or she depresses the microphone mute switch 21 again, so that the audio signal processing unit 52 outputs signals to the audio output terminals 43. At this time, since the LED is turned off, the operator can easily recognize that his or her voice is being input.

The portrait photographing mode will be described below with reference to FIGS. 7, 8, and 11. In the portrait photographing mode, the arm 6 is pivoted in the direction of an arrow D1, and the arm 5 and the camera head 2 are set to point in substantially the horizontal direction. When the arm 6 is pivoted in the direction of the arrow D1, the camera head 2 is separated away from the object, thereby adjusting the image displayed on the monitor 33 to have an appropriate size. For this purpose, the maximum pivot angle, $\Omega(D1)$, in the direction of the arrow D1, of the hinge 15 is set to be as large as 40°, as described above. Subsequently, in FIG. 7, the camera head 2 is pivoted through 180° in the direction of an arrow A2. This is because a vertically inverted image of the person is displayed when the camera head 2 is merely turned from the document photographing state shown in FIG. 1 to the horizontal state.

In the conventional image input apparatus, since the camera head cannot be pivoted through 180°, as has been described in the prior art, the vertical direction of the CCD of the image pickup unit is set with reference to a person, and an original must be set in an upside-down state when viewed from the operator in the document photographing mode. For this reason, it is difficult for the operator to read an original, or the like, as has been described above. However, in this embodiment, since the camera head 2 can be pivoted through 190°, the operability can be improved even in the document photographing mode. That is, the operator can observe both an original and its image on the monitor 33 in an erected state.

As described above, the indices shown in FIG. 8 are embossed and printed at 180° opposing positions on the focus adjustment ring 1a and the aperture adjustment ring 1b of the lens 1. With these indices, even when the camera head 2 is pivoted through 180°, the operator can perform focus and aperture adjustments while observing the indices as in the document photographing mode. In this embodiment, the aperture adjustment ring 1b has different colors at 180° opposing positions. This is to basically confirm whether the camera head 2 is set in the portrait or document direction (to display an erected image on the monitor) without observing the monitor screen, i.e., in a power-OFF state, a state wherein the apparatus is not connected to the monitor, and the like. With this arrangement of this embodiment, the operability can be improved.

In order to distinguish the portrait and document directions from each other, logos such as "portrait" and "document" may be printed at 180° opposing positions of the outer case of the camera head 2, thus obtaining the same effect as described above. For example, as shown in FIG. 1, a portion M printed with the logo of the document photographing mode is assured at an appropriate position on the outer case of the camera head 2, and a portion M' printed with the logo of the portrait photographing mode is assured on the rear side of the portion M.

Furthermore, the maximum pivot angle, $\Omega(A2)$, of the camera head 2 (first pivot portion 4) is set to be 190° so as to prevent an image from being tilted even when the main body base 14 is placed on an inclined surface, as described above. Thus, even when the main body base 14 is placed on the surface inclined at a maximum of 10°, an image can be corrected to the horizontal state by appropriately pivoting only the camera head 2. Furthermore, since the maximum pivot angle $\Omega(A2)$ of the camera head 2 is set to be 190°, problems associated with parts precision or assembling precision can be solved. A pivot angle of 180° is often insufficient for absorbing accumulated errors of an inclination error of the CCD image pickup surface with respect to the attachment portion on the CCD, an inclination error upon attachment of the CCD to the camera head, an inclination error of the pivot stopper with respect to the camera head, and the like. In view of this problem, the pivot angle requires a margin, and is set to be 190°, as described above. Thereafter, the position of the camera head 2 is finely adjusted while observing the monitor 33, and furthermore, focus adjustment, brightness or color tone adjustment, or shutter speed selection is performed, thus completing preparation for the photographing operation.

In the above-mentioned portrait photographing mode, a drawing adhered on the wall surface, a vertical surface such as a blackboard, or the like may be similarly photographed.

A partially enlarged photographing operation of the original 35 will be described below with reference to FIGS. 9 and 13. When a portion of the original 35 is to be photographed in an enlarged scale, the lens 1 can be brought close to the original 35, as shown in FIG. 13. The photographing range at that time is W3, and is displayed on the monitor 33, thus attaining an enlarged photographing operation. In this embodiment, the maximum pivot angle, $\Omega(D2)$, of the hinge 15 is set to be 24°, so that the lens 1 can reach the corner portion of the A4-size original 35.

When the right corner portion of the original 35 is photographed in an enlarged scale, as shown in FIG. 9, the camera head 2 must be pivoted through an angle $\theta(E2)$ about the second pivot portion 16 as the pivot fulcrum until it is located at the right corner portion, and must then be pivoted through an angle $\Omega(A1)$ about the first pivot portion 4 as the pivot fulcrum, as shown in FIG. 9. The reason why the camera head 2 is pivoted about the two pivot portions is to solve the following problem and to obtain an erected image on the monitor 33. That is, when the camera head 2 is merely pivoted through the angle $\theta(E2)$ about the second pivot portion 16, an image of the corner portion of the original 35 is obliquely displayed on the monitor 33 (not an erected image), resulting in a very poor image.

In this embodiment, the angle $\Omega(A1)$ is set to be 60°. However, this problem can be basically solved by arranging the apparatus to satisfy $\theta(E2)=\Omega(A1)$ at any position within the predetermined pivot range for displaying the image of the original 35. Similarly, when the left corner portion is to be photographed in FIG. 9, the camera head 2 is pivoted in the direction of the arrow A2. As described above, since the maximum pivot angle $\Omega(A2)$, in the direction of the arrow A2, of the camera head 2 is set to be 190°, a corner portion of even an original larger than A4 size can be sufficiently photographed in an enlarged scale. Furthermore, since the camera head 2 pivots in the directions of the arrows A1 and A2, the entire original 35 can be photographed even when it is offset from the central line of the main body, as shown in FIG. 10.

A case upon carrying or storing the apparatus will be explained below with reference to FIG. 12.

The arm 6 is set to be substantially perpendicular to the placing surface 36. Subsequently, the camera head 2 is pivoted about the hinge 11 in the direction of an arrow B1 until its pivotal motion is regulated by a pivot stopper (to be described later) of the hinge 11. Then, the arm 5 is pivoted about the hinge 12 in the direction of an arrow C2 until its pivotal motion is regulated by a pivot stopper (to be described later) of the hinge 12. At this time, the stopper of the hinge 12 is set so that the arms 5 and 6 extend nearly parallel to each other.

As described above, by folding the respective arms and the like via the respective pivot portions, the entire apparatus can have a compact form, as shown in FIG. 12, and can be left on the desk without obstructing anything when it is not used. The apparatus can be easily carried since the operator can simultaneously hold the arms 5 and 6. In order to make the apparatus compact, the maximum pivot angle, $\Omega(C2)$ of the hinge 12 is set to be 90°.

In other words, since the apparatus of the present invention allows the arms 5 and 6 to be folded in a parallel state, as shown in FIG. 12, portability and storage ability are greatly improved. When the arms 5 and 6 are folded in this manner, the main cable 25 is exposed and flexed from the hinge 12, as shown in FIG. 4. Therefore, any excessive force can be prevented from acting on the main cable 25 even in the form shown in FIG. 12, i.e., the main cable 25 can be prevented from being damaged. In order to assure the interval h between the distal end of the lens 1 and the placing surface 36 in the compact form shown in FIG. 12, the maximum pivot angle, $\Omega(B1)$, in the direction of the arrow B1, of the hinge 11 is set to be 140°. Since the interval h is assured, when the arms are folded, as shown in FIG. 12, or when the apparatus in the state shown in FIG. 12 is carried and placed on the placing surface, the lens 1 can be prevented from being damaged upon crashing on the placing surface.

As described above, in this embodiment, the standard size of the original 35 is assumed to be A4 size. A case will be explained below with reference to FIG. 14 wherein the entire original larger than A4 size is to be photographed. Note that the form indicated by an alternate long and two short dashed line in FIG. 14 corresponds to that shown in FIG. 4.

From the form indicated by the alternate long and two short dashed line, the arm 6 is pivoted about the hinge 15 in the direction of an arrow D2, the arm 5 is pivoted about the hinge 12 in the direction of an arrow C1, and the camera head 2 is pivoted about the hinge 11 in the direction of an arrow B2. As a result, since the camera head 2 is located at the position higher than that for the A4-size original, the photographing range is broadened from W2 to W3, and a larger original can be entirely photographed. In order to take such a form, the maximum pivot angle, $\Omega(B2)$, in the direction of the arrow B2, of the hinge 11 is set to be 15°, and the maximum pivot angle, $\Omega(C1)$, in the direction of the arrow C1, of the hinge 12 is set to be 20°.

The main cable 25 connected to the camera head 2 will be explained below.

Referring to FIG. 16, the main cable 25 comprises, e.g., a 19-line compound cable including three 75$\Omega$ coaxial lines. The main cable 25 comprises, inside its sheath, a shield material (in this embodiment, a single mesh winding of a tin-plated copper wire is preferable, but the present invention is not limited to this), the shield material is folded to cover the sheath, and a conductive copper foil tape 25b is wound around the folded portion. The metal clamp 221 comprises a roughly arcuated portion 221a and a roughly sawtooth-shaped portion 221b. The metal clamp 221 clamps the tape 25b portion of the main cable 25 by the roughly arcuated portion 221a, and the roughly sawtooth-shaped portion 221b bites into the sheath of the main cable 25, thereby securely fixing the main cable 25 to the tilt chassis 220. Since the main cable 25 is fixed in this manner, even when the main cable 25 is pulled in the direction of an arrow 223, it can be prevented from being removed from the camera head 2 and the internal cable can be prevented from being disconnected.

Furthermore, the main cable 25 is released from the constraint of the tape 25b, and is separated into signal lines 25a. These signal lines 25a extend through the head shaft 219, and are then fixed by the mold clamp 215. This portion allows the main cable 25 to rotate in correspondence with the rotation in the directions of arrows A1 and A2 about the head shaft 219 of the head chassis 212 as the rotation shaft. That is, since the video circuit board 208 rotates upon this rotation, the main cable 25 coupled to the connector of the video circuit board 208 is similarly twisted. In this case, the main cable 25 is rotated through 190° in the direction of the arrow A2. However, if the main cable 25 is kept covered with the sheath, the cable 25 can only be twisted through at most 60° in the circumferential direction since the sheath acts to resist the twist. In view of this problem, the sheath is partially removed to separate the cable into the respective signal lines 25a, and the signal lines 25a are bundled by the mold clamp 215, thus allowing smooth rotation through 190°.

The signal lines 25a fixed by the mold clamp 215 are then reversed by the vertical plate 213, and are coupled to the connectors 210 and 211 on the video circuit board 208. Although the signal lines 25a which are not covered by the shield material may serve as a noise source for the CCD 203, noise components generated by the signal lines 25a are shielded by the vertical plate 213. On the other hand, the signal lines 25a themselves are easily influenced by noise since they have no shield material. To solve this problem, this embodiment takes the following countermeasure.

That is, a GND line 25c is fixed by soldering to the tape 25b of the main cable 25, and is connected to a GND terminal of the video circuit board 208 via a connector. The GND terminal of the video circuit board 208 is grounded to the lens chassis 204, and the shield cases 227 and 228 are fixed by screws to the lens chassis 204, as shown in FIG. 17. Therefore, the shield cases 227 and 228 are grounded to the shield material of the main cable 25 via the video circuit board 208, the GND line 25c, and the tape 25b. With this arrangement, the respective signal lines 25a are shielded from noise by the shield cases 227 and 228.

A case will be explained below wherein the camera head 2 is rotated in the directions of the arrows A1 and A2.

As shown in FIG. 16, the lens chassis 204 is fixed by screws to the head chassis 212 to constitute the framework of the camera head 2. Since the camera head 2 is constituted by attaching the shield cases 227 and 228 and the camera cases 225 and 226 to this framework, as shown in FIG. 17, rotation of the camera head 2 is realized by rotation of the head chassis 212 in the directions of the arrows A1 and A2.

Referring to FIG. 16, the head chassis 212 is pivotally and axially supported by the head shaft 219 at its round hole 212a, and is urged by the urging force, in the direction of the arrow 223, of the wave washer 217 via the washer 218. In this embodiment, the washer 218 consists of an ultra-high-molecular-weight polyethylene sheet which has a small frictional coefficient and a high wear resistance. Upon rotation of the head chassis 212, the washer 218 rotates together with the head chassis 212, and the washers 218 and 217 slip with respect to each other. If a represents the frictional force between the head pan plate 216 and the wave washer 217, b represents the frictional force between the wave washer 217 and the washer 218, and c represents the frictional force between the washer 218 and the head chassis 212, a>b and c>b hold among these frictional forces, and the frictional force between the washer 218 and the wave washer 217 is smallest.

Slip between the washer 218 and the wave washer 217 can attain a slide motion smoother than that obtained between two metal members since they respectively consist of a resin sheet and a metal. Upon rotation of the head chassis 212 in the directions of the arrows A1 and A2 by the urging force from the wave washer 217, a rotation torque T is generated. Therefore, even when the operator stops rotation of the camera head 2 at an arbitrary position, the camera head 2 can be prevented from rotating further by its weight or inertia. Furthermore, the rotation torque T has a larger value than those of the focus adjustment ring 1a and the aperture adjustment ring 1b provided to the lens 1. For this reason, even when the operator rotates these rings, the camera head 2 itself can be prevented from being rotated.

As described above, the camera head 2 is rotated in the directions of the arrows A1 and A2. When the head chassis 212 is rotated through about 60° in the direction of the arrow A1 in FIG. 17, a pawl portion 212b of the head chassis 212 contacts the stopper 216a of the head pan plate 216, thus regulating the rotation. In the direction of the arrow A2 as well, when the head chassis 212 is rotated through about 190°, the pawl portion 212b of the head chassis 212 contacts the stopper 216a (not shown) of the head pan plate 216, thus regulating the rotation.

A case will be explained below wherein the joint 7 including the camera head 2 is rotated in the directions of the arrows B1 and B2.

Referring to FIG. 18, the tilt shaft 238 is positioned to arcuated holes 220a and 220b of the tilt chassis 220 by its arcuated projections 238b and 238c, and is fixed to the tilt chassis 220 by screws 240. A shaft portion 238a engages with a hole 7a of the joint 7, the washer 237, the metal washer 236, and the belleville spring 235, and serves as a rotation shaft in the directions of the arrows B1 and B2. The washer 237, the metal washer 236, and the belleville spring 235 are sandwiched between the tilt chassis 220 and the joint 7. The belleville spring 235 generates a urging force in the direction of an arrow 242, and urges the metal washer 236 against the joint 7 via the washer 237. The metal washer 236 has a role of transmitting the urging force of the belleville spring 235 to the entire surface of the washer 237. If the metal washer 236 is not arranged, the belleville spring 235 bites into the washer 237, and a deflection amount required for the belleville spring 235 cannot be obtained. As a result, a required urging force cannot be generated.

When an appropriate urging force of the belleville spring 235 is obtained by the metal washer 236, a predetermined rotation torque is generated upon rotation of the tilt chassis 220 in the directions of the arrows B1 and B2. This rotation torque allows the camera head 2 and the joint 7 to be held at a position that the operator intended. The washer 237 consists of an ultra-high-molecular-weight polyethylene sheet which has a small frictional coefficient and a high wear resistance. Therefore, upon rotation of the tilt chassis 220, the belleville spring 235, the metal washer 236, and the washer 237 rotate together with the tilt chassis 220, and the washer 237 and the joint 7 slip with respect to each other. This is because the frictional force between the washer 237 and the joint 7 is smallest as compared to those of other portions.

The slide motion between the washer 237 and the joint 7 is smoother than that obtained between two metal members since they respectively consist of a resin sheet and a metal. The tilt shaft 239 is positioned with respect to holes 220c, 220d, and 220e of the tilt chassis 220 by cylindrical projections 239a and 239b and an arcuated projection 239d, and is fixed to the tilt chassis 220 by screws 241. A shaft portion 239c engages with a hole 7b of the joint 7, and serves as a rotation shaft in the directions of the arrows B1 and B2. On the other hand, the projection 239d of the tilt shaft 239 engages with an arcuated elongated hole 7c of the joint 7. When the tilt chassis 220 has rotated through 50° in the direction of the arrow B1 or through 105° in the direction of the arrow B2 with respect to the horizontal axis, the projection 239d contacts the corresponding end face of the elongated hole 7c, thus regulating the rotation. In this manner, the joint 7 including the camera head 2 can be rotated in the directions of the arrows B1 and B2.

The torque generation mechanism of the hinge 12 will be explained below with reference to FIG. 19.

The nut 106 has rotation grooves that can be accessed by a screwdriver. When the nut 106 is rotated clockwise by a screwdriver, the belleville spring 105 is flexed gradually. By the repulsion force of the belleville spring 105, the joint 8 is pressed from the two surface sides. Note that each pivot washer 104 consists of a relatively thick metal plate (in this embodiment, a thickness of 1.6 mm). This material can prevent the pivot washer 104 from being flexed by the repulsion force generated by the belleville spring 105, and distributes the force of the belleville spring 105 to a wide surface, thus enhancing the frictional force (to be described later).

In the joint 8, frictional forces are generated at two positions, as will be described below, and a holding torque is generated. Since each slide washer 102 is fixed to the joint 8 so as not to be pivotal, the support plate 107 and the slide washer 102 slide against each other, and a frictional force is generated between their contact surfaces. Since the pivot washer 104 is fitted on the metal pivot shaft 101 and pivots integrally with the shaft 101, the slide sheet 103 sandwiched between them slides together with one of the support plate 107 and the pivot washer 104, thus generating a frictional force.

At this time, since the slide sheet 103 is free to pivot, and the support plate 107 and the pivot washer 104 consist of the same material, they have substantially the same frictional coefficients. For this reason, the frictional forces generated on the two surfaces of the slide sheet 103 approximately equal each other. As a result, although the slide surface is formed between the support plate 107 and the slide washer 102 or between the slide sheet 103 and the pivot washer 104 depending on a slight difference in roughness of the slide surface or environmental conditions such as temperature, humidity, and the like, the holding torque generated is hardly influenced by the position of the slide surface.

The holding torque to be generated depends on the pressing force in the axial direction. The pressing force depends on the compression amount of the belleville spring 105. For this reason, in order to obtain a required holding torque, the rotation amount of the nut 106 can be adjusted. Note that each slide washer 102 has an L-shaped section, and its axially extending portion is inserted between the circular hole of the support plate 107 and the pivot shaft 101. This is to prevent wear of two metal members when the support plate 107 and the pivot shaft 101 are in direct and sliding contact with each other. To rotate the nut 106, a hexagon torque wrench, a screwdriver, a special-purpose jig or tool or the like may be used instead of the screwdriver.

The loosening prevention mechanism of the hinge 12 will be explained below with reference to FIGS. 19 and 20. In this case, since the structure on the right side of the central line of the plane of the drawing in FIG. 19 is exclusively related to this mechanism, the following description will be given with reference to only the right side of the central line in FIG. 19.

As described above, in FIG. 20, the shaft portion of the pivot shaft 101 and the hole of the pivot washer 104 each have the two D-cut surface portions. The D-cut width of the pivot washer 104 is larger than that of the pivot shaft 101. The tongue-shaped extended portions 102a of the slide washer 102 are fitted in gaps defined by these shaft and hole. This structure prevents the nut 106 from rotating in the direction to loosen, as will be described below.

When the joint 8 pivots, the pivot washer 104 rotates together with the pivot shaft 101. If a structure in which the pivot washer 104 is not driven by the joint 8 is adopted, the pivot washer 104 stands still and the metal nut 106 receives a frictional force for stopping the nut 106 via the belleville spring 105 and a frictional force for pivoting the nut 106 via the screw portion of the pivot shaft 101. If the frictional force for stopping the nut 106 is larger than the other frictional force, the nut 106 and the pivot shaft 101 easily rotate relative to each other, and the nut 106 undesirably rotates in the direction to loosen little by little upon repetition of the pivotal motion. As a result, the holding torque decreases.

In order to solve this problem, the following method may be used. That is, the hole portions of the pivot washer 104 are D-cut, and the D-cut shaft portion of the pivot shaft 101 is fitted into the D-cut hole of the washer 104 so as to prevent the pivot washer 104 from pivoting. However, with this method, a small gap is undesirably generated between the hole and shaft. Owing to play generated by this small gap, a frictional force for stopping the rotation of the nut 106 acts on the nut 106, and consequently, the nut 106 rotates in the direction to loosen, as described above. Thus, a portion of the slide washer 102 is extended, and the pivot washer 104 is fitted on the extended portion with a light pressure so as to eliminate the play, thereby preventing the nut 106 from rotating in the direction to loosen.

The pivot angle of the hinge 12 will be described below with reference to FIG. 20.

The arcuated rib portion 8a of the abovementioned joint 8 and the projections 107a of the support plate 107 constitute a stopper for regulating the pivot angle. More specifically, when the joint 8 pivots, since the rib portion 8a contacts one of the projections 107a, the joint 8 can no longer pivot. The pivot angle at that time is the maximum pivot angle $\Omega(C1)$ or $\Omega(C2)$. Needless to say, a desired pivot angle can be obtained by appropriately changing the position of the rib portion 8a or the projections 107a.

The torque generation mechanism of the hinge 15 will be described below with reference to FIG. 21.

The nut 119 has rotation grooves that can be accessed by a screwdriver. When the nut 119 is rotated clockwise, the belleville spring 118 is flexed gradually. Then, by the repulsion force of the belleville spring 118, the pivot plate 111 is pressed from the two surface sides. Note that the stationary washer 117 consists of a relatively thick metal plate (in this embodiment, a thickness of 1.6 mm). This material can prevent the stationary washer 117 from being flexed by the repulsion force generated by the belleville spring 118, and distributes the force of the belleville spring 118 to a wide surface, thus enhancing the frictional force (to be described later). In the pivot plate 111, frictional forces are generated at two positions, as will be described below, and a holding torque is generated. Since the slide washer 115 is fixed to the base plate 112 so as not to be pivotal (the detail of this structure is not shown), the pivot plate 111 and the slide washer 115 slide against each other to generate a frictional force between their contact surfaces.

Since the slide sheet 116 is free to pivot, and the pivot plate 111 and the stationary washer 117 consist of the same material, they have substantially the same frictional coefficients. For this reason, the frictional forces generated on the two surfaces of the slide sheet 116 nearly equal each other. As a result, although the slide surface is formed between the pivot plate 111 and the slide sheet 116 or between the slide sheet 116 and the stationary washer 117 depending on a slight difference in roughness of the slide surface or environmental conditions such as temperature, humidity, and the like, the holding torque generated is hardly influenced by the position of the slide surface.

The holding torque to be generated depends on the pressing force in the axial direction. The pressing force depends on the compression amount of the belleville spring 118. In order to obtain a required holding torque, the rotation amount of the nut 119 can be adjusted. Note that the slide washer 115 has an L-shaped section, and its axially extended portion is inserted between the circular hole of the pivot plate 111 and the metal support shaft 114. This is to prevent wear of two metal members when the pivot plate 111 and the support shaft 114 are in direct and sliding contact with each other.

The loosening prevention mechanism of the hinge 15 will be explained below with reference to FIG. 21.

As described above, the shaft portion of the support shaft 114 and the hole of the stationary washer 117 each have the two D-cut surface portions. The D-cut width of the stationary washer 117 is larger than that of the support shaft 114. The tongue-shaped extended portions 115a of the slide washer 115 are fitted in gaps defined by these shaft and hole. This structure prevents the nut 119 from rotating in the direction to loosen, as will be described below.

When the pivot plate 111 pivots, the frictional force is transmitted to the stationary washer 117 via the sliding sheet 116 to pivot the washer 117. If the stationary washer 117 is free to pivot, the frictional force is transmitted to the nut 119 via the belleville spring 118. Although a frictional force is generated between the nut 119 and the screw portion of the support shaft 114, if the frictional force transmitted from the pivot plate 111 is larger than this frictional force even slightly, the nut 119 rotates little by little in the direction to loosen upon repetition of the pivotal motion. As a result, the holding torque decreases.

In order to solve this problem, the following method may be used. That is, the hole portions of the stationary washer 117 are D-cut, and the D-cut shaft portion of the support shaft 114 is fitted into the D-cut hole of the washer 117 so as to prevent the stationary washer 117 from pivoting. However, with this method, a small gap is undesirably generated between the hole and shaft. Owing to play generated by this small gap, a frictional force acts on the nut 119 to rotate it in the direction to loosen. Therefore, as described above, a portion of the slide washer 115 is extended, and the stationary washer 117 may be fitted on the extended portion with a light pressure so as to eliminate the play, thereby preventing the nut 119 from rotating in the direction to loosen.

If the torque lowers, the detachable blindfold cover 120 is detached, and the nut 119 is tightened stronger using a screwdriver, thus increasing the holding torque again. To rotate the nut 119, a hexagon torque wrench, a special-purpose jig or tool, or the like may be used instead of the screwdriver.

The pivot angle of the hinge 15 will be explained below with reference to FIG. 22.

The projections 111a of the above-mentioned pivot plate 111, the tongue portions 112a of the base plate 112, and the tongue portions 113a of the base auxiliary plate 113 constitute stoppers for regulating the pivot angles. More specifically, when the pivot plate 111 pivots, since the projections 111a contact the tongue portions 112a and 113a, the pivot plate 111 can no longer pivot. The pivot angle at that time is the maximum pivot angle $\Omega(D1)$ or $\Omega(D2)$. Needless to say, a desired pivot angle can be obtained by appropriately changing the positions of the projections 111a or the tongue portions 112a and 113a.

The pivotal motion of the pivot portion 16 will be described below with reference to FIG. 22.

The slide shaft 130, to which the base plate 112 of the above-mentioned hinge 15 is fixed, is fitted in the round hole of the main body base 14 to be pivotal about the axis 16a, and the pan plate 133 is fixed from below to the slide shaft 130 via the washer 131 and the wave washer 132. When the wave washer 132 is flexed, the slide shaft 130 is pressed against the main body base 14 by the repulsion force of the washer 132 to generate a friction force, thereby generating a torque upon pivotal motion. As has been described above in the paragraphs of the camera head 2, since the washer 131 and the wave washer 132 slip against each other in accordance with the frictional force acting therebetween, a smooth slide motion can be obtained.

The bottom surface of the base plate 112 of the hinge 15 is circular. Although not shown, a portion of the circular bottom surface projects in the planar direction. Also, the slide surface, with respect to the slide shaft 130, of the main body base 14 also partially projects (14a). When the main body base 14 pivots, the above-mentioned projections contact each other to serve as a stopper for regulating the pivotal motion. In this embodiment, the positions of these projections are determined so that the pivot angle of the second pivot portion 16 becomes 180°. Of course, the present invention is not limited to this.

The support shaft 130 has a central through hole, and the main cable 25 that extends inside the arm 6 passes through this through hole. Furthermore, the hinge 15 also has a central hollow space, as described above, and does not disturb the route of the main cable 25. For this reason, no excessive force acts on the cable in the hinge 15 and the second pivot portion 16.

The internal structure of the main body base 14 will be described below.

Referring to FIG. 23, the main cable 25 extends through the arm 6, the joint 10, and the hole 245a of the ballast 245, and is fixed to the ballast 245 by the metal clamp 247. The metal clamp 247 has a roughly arcuated portion 247a and a roughly sawtooth-shaped portion 247b. The metal clamp 247 clamps a conductive copper foil tape 25d portion of the main cable 25 by its roughly arcuated portion 247a, and the roughly sawtooth-shaped portion 247b bites into the sheath of the main cable 25, thus preventing the main cable 25 from being removed even when it is pulled in the direction of an arrow 253.

Furthermore, the main cable 25 is released from the constraint of the tape 25d, and is separated into signal lines 25e. These signal lines 25e pass through a hole (not shown) of the main circuit board 248, and are connected to a connector arranged on a solder surface of the main circuit board 248. The solder surface of the main circuit board 248 also has an adjustment connector (not shown). In the final form with all the components except for the rear cover 249, the electrical final adjustment of, e.g., synchronization of signals, the color tone of an image, and the like can be made using the adjustment connector.

Since the main cable 25 is separated into the respective signal lines 25e from the position of the tape 25d, the signal lines 25e can be folded in a narrow space, as shown in FIG. 23. In this case, the respective signal lines 25e are easily influenced by noise since they are not particularly shielded. In this embodiment, a leg portion 245c of the ballast 245 is fixed to the chassis 253 by a screw. The chassis 253 is connected to a power supply earth via the main circuit board 248, and the ballast 245 consists of a zinc-based material since it serves as a weight. Therefore, the ballast 245 is connected to the power supply earth via the screw.

With this structure, the respective signal lines 25e are shielded by the ballast 245 and the chassis 253. The same applies to the main circuit board 248, i.e., the main circuit board 248 is shielded from noise by the chassis 253 and the ballast 245. Since the tape 25d fixes the shield material inside the sheath of the main cable 25, the shield material of the main cable 25 is connected to the ballast 245 via the tape 25d, and is grounded to the power supply earth. With this structure, the entire main cable 25 is shielded, i.e., is strong against noise. The ballast 245 has not only a role of a weight but also a role of the shield material, as described above, and its surface is silver in color. Therefore, in the square hole 245b, the ballast itself serves as a reflection surface for amplifying the amount of light emitted by the power LED 246, so that bright light with high visibility can be output from the power LED lens 18.

The main body base 14 is provided with the AGC switch 19, the negative/positive reversal switch 20, the microphone mute switch 21, and the WB switch 22. The negative/positive reversal switch 20 will be described below. The negative/positive reversal switch 20 is constituted by the negative/positive selection switch button 250, the coil spring 251, and the ring 252. When the operator depresses the negative/positive selection switch button 250, a tact switch 248a on the main circuit board 248 is turned on, thereby switching the image between negative and positive modes.

The image input apparatus of this embodiment can be attached to a tripod for a still camera or video camera by the screw portion 249a for a tripod and the hole 249b for receiving a pin for preventing rotation on the rear cover 249. Thus, the image input apparatus can be set not only on the desk but also in a place required by the operator using the tripod.

Furthermore, in the image input apparatus of this embodiment, even when the main cable 25 is disconnected by bending during use, and an image cannot be output, the main cable 25 can be exchanged as follows. More specifically, the rear cover 249 is detached, the connector of the main cable 25 is disconnected from the main circuit board 248, and the chassis 253 is detached from the main body base 14 vertically downward. The metal clamp 247 is detached from the ballast 245, and the portion, exposed from the joint 7, of the main cable 25 is pulled in the direction of the arrow 253 to remove the cable 25 from the arm 6. Then, the main cable 25 fixed to the camera head 2 and the head base 3 is detached, and the portion, exposed from the joint 7, of the main cable 25 is pulled to remove the cable 25 from the arm 5. In this manner, the disconnected main cable 25 can be removed, and can be exchanged with a new cable.

The specific numerical values such as angles and the like in the above embodiment can be appropriately changed within the scope of the present invention, and optimal values may be selected in correspondence with an actual use condition.

In the above embodiment, in particular, the structure around the joint portion for coupling the columns, the cable lay structure or method, and the like can be effectively applied to an electronic equipment or electronic apparatus which can adopt the structure of this type. For example, in an illumination apparatus such as a desk lamp, a medical equipment, or the like, a distal end member is set at a desired position via a column with respect to a base end member, and these members are connected via a cable.

As described above, according to this embodiment, the following effects can be obtained.

More specifically, in an image input apparatus in which a camera head is held at an arbitrary position via a plurality of hinge portions, a plurality of columns, and a plurality of pivot portions, and is rotatable about the optical axis, one of the pivot portions has a pivot range of 180° or more, one of the hinge portions has a pivot range of 90° or more, and the pivot angle of the second pivot portion can be set to be equal to that of the first pivot portion within a predetermined range in which an image of an object is to be picked up. Even when the placed position of an original is offset from the front side of the apparatus main body, the camera head can be moved in correspondence with the original position, and the inclination of the camera head can be adjusted in correspondence with the inclination of the original. In other words, the original need not be accurately placed in front of the apparatus main body, and hence, the operability in the document photographing mode can be improved. In addition, even when the original is placed at an offset position, as described above, an appropriate document photographing operation is guaranteed. Furthermore, even when the camera head is moved to the corner portion of the original, the photographing operation can be performed without tilting the image displayed on the screen of the monitor, thus improving operability.

In an image input apparatus of this type, in which an image signal obtained by an image pickup unit is input to an apparatus main body to perform the signal processing of the input signal, when an object image is to be picked up, a portrait or document photographing operation can be selectively attained by appropriately pivoting the respective joint portions. For example, in the document photographing mode, the operator can easily recognize the rotation direction of the focus or aperture ring, and an apparatus which has improved operability and is easy to handle can be realized. When the photographing operation is performed while switching the photographing mode between the portrait and document photographing modes, the operator can easily and accurately recognize the current photographing mode by the indication portion on the outer case of the camera head, thus greatly improving operability.

In an image input apparatus of this type, in which an image signal obtained by an image pickup unit is input to an apparatus main body to perform the signal processing of the input signal, since a signal processing circuit board is arranged between a metal bottom plate and a metal weight, which constitute a base, the signal processing circuit board is enclosed by the metal bottom plate and the metal weight. With this structure, the signal processing circuit board, which is easily influenced by noise, can be reliably electrically shielded from noise, and a structure which is very strong against noise can be realized. Therefore, an image with very high image quality can be obtained on the side of an image output apparatus such as a monitor.

When the signal processing circuit board is electrically shielded, the weight that is used for keeping the balance of the apparatus is effectively used to serve as a shield case, and no new shield case is added. Therefore, a low-cost image input apparatus which is strong against noise and has a simple structure can be realized.

In an image input apparatus of this type, in which an image signal obtained by an image pickup unit is input to an apparatus main body to perform the signal processing of the input signal, when an object image is to be picked up using a camera head, the camera head can be moved to a desired position by appropriately pivoting the respective joint portions, thus attaining a portrait or document photographing operation. For example, in a document photographing mode, when an original or the like is set on the placing surface, the original can be easily positioned with respect to the apparatus main body with reference to an index of a base that supports the camera head. At the same time, since the camera head can also be easily positioned with respect to the apparatus main body, operability in the document photographing mode can be improved. In this case, since the index is formed at the center of the front surface of the base, a reference position for the positioning operation can be easily determined, thus guaranteeing an easy and accurate operation. Since the indication portion is effectively used as such index, the operability in the document photographing mode can be improved without unnatural apparatus design.

Furthermore, the following effects can be obtained.

(1) When the camera head is pivoted about the first hinge portion, the cable slides toward the second hinge side in the first column. Since the first hinge portion has no pivot axis that interferes with the cable, the cable can form a large R (radius of curvature) at the first hinge portion. Therefore, no load is imposed on the cable. In this case, the second hinge portion constitutes a buffer for the cable, and the cable can slide inside the first column.

(2) When the first and second columns pivot about the second hinge portion as a fulcrum, the cable exposed from the second hinge portion is curved or bent with a large R. For this reason, a local stress can be prevented from acting on the cable, thus avoiding disconnection of the cable.

(3) When the second column pivots about the third hinge portion, since the third hinge portion has no pivot axis that interferes with the cable, the cable can also form a large R at the third hinge portion. Therefore, in this case as well, an excessive load can be prevented from acting on the cable.

Therefore, in a compact image input apparatus which has no original table, the cable can be smoothly and adequately laid around the hinge portions without exerting any excessive load on the cable.

Furthermore, according to this embodiment, a structure around the hinge portions, which allows to lay the cable without any excessive load can be effectively applied to other electronic equipments or apparatuses.

As many apparently widely different embodiments of the present invention can be made without departing from the spirit and scope thereof, it is to be understood that the invention is not limited to the specific embodiments thereof except as defined in the appended claims.

What is claimed is:

1. An image input apparatus in which an image signal obtained by an image pickup unit is input to an apparatus main body to perform signal processing of the input signal, comprising:

a camera head arranged at a distal end side of a pair of columns which are coupled via a plurality of joint portions;

a signal processing unit which is incorporated in a base of the apparatus main body, which supports a proximal end side of the pair of columns; and a cable which is arranged along the pair of columns and connects said camera head and said signal processing unit, wherein the plurality of joint portions consists of a first joint portion consisting of a first hinge portion and a first pivot portion for joining said camera head with one of the pair of columns, a second joint portion consisting of a second hinge portion for joining the pair of columns, a third joint portion consisting of a third hinge portion and a second pivot portion for joining the other of the pair of columns with the base of the apparatus main body, wherein when the image signal is input from said camera head to said signal processing unit, an optical axis direction and an angle about the optical axis of said camera head can be adjusted via the joint portions, and wherein at least said first hinge portion of said first joint portion can be pivoted through not less than 90°, and at least said first pivot portion can be pivoted through not less than 180°.

2. The apparatus according to claim 1, wherein said camera head can be translated by pivoting said first pivot portion of said first joint portion and said second pivot portion of said third joint portion in opposite directions by the same amount.

3. The apparatus according to claim 1, wherein the base comprises a metal bottom plate, a signal processing circuit board, a metal weight, and a resin cover.

4. The apparatus according to claim 1, wherein an index indicating a direction of said camera head with respect to the base is arranged at least at a center of a front surface of the base.

5. The apparatus according to claim 1, wherein said apparatus has an arrangement that can prevent a route of said cable from interfering with pivot axes of the joint portions when said cable is laid.

6. An image input apparatus in which an image signal obtained by an image pickup unit is input to an apparatus main body to perform signal processing of the input signal, comprising:

a camera head arranged at a distal end side of a pair of columns which are coupled via a plurality of joint portions;

a signal processing unit which is incorporated in a base of the apparatus main body, which supports a proximal end side of the pair of columns; and a cable which is arranged along the pair of columns and connects said camera head and said signal processing unit, wherein the pair of columns consists of a first column and a second column, wherein the plurality of joint portions consists of a first joint portion consisting of a first hinge portion and a first pivot portion for joining said camera head with the first column, a second joint portion consisting of a second hinge portion for joining the pair of columns, a third joint portion consisting of a third hinge portion and a second pivot portion for joining the second column with the base of the apparatus main body, wherein said camera head comprises a lens portion which allows a rotation operation, and an index that can indicate the rotation operation state is arranged at an appropriate position on an outer surface of said lens portion, wherein an angle of said camera head at least about an optical axis can be adjusted via the joint portions, and a plurality of indices that can indicate a rotation operation state are arranged at 180° separated positions on the outer surface of said lens portion, and wherein said camera head is supported by one end of the first column via said first joint portion so that an optical axis direction with respect to the first column and a pivot angle about the optical axis of said camera head can be adjusted.

7. The apparatus according to claim 1, wherein an indication portion for indicating a photographing mode is arranged at an appropriate position on an outer case of said camera head.

8. The apparatus according to claim 7, wherein said camera head is supported via the columns and the joint portions to be rotatable through at least 180° with respect to the base and a plurality of indication portions for indicating photographing modes corresponding to pivot positions are arranged at appropriate positions on the outer case of said camera head.

9. An image input apparatus in which an image signal obtained by an image pickup unit is input to an apparatus main body to perform signal processing of the input signal, comprising:

a camera head arranged at a distal end side of a pair of columns which are coupled via a plurality of joint portions;

a signal processing unit which is incorporated in a base of the apparatus main body, which supports a proximal end side of the pair of columns; and a cable which is arranged along the pair of columns and connects said camera head and said signal processing unit, wherein the plurality of joint portions consists of a first joint portion consisting of a first hinge portion and a first pivot portion for joining said camera head with one of the pair of columns, a second joint portion consisting of a second hinge portion for joining the pair of columns, a third joint portion consisting of a third hinge portion and a second pivot portion for joining the other of the pair of columns with the base of the apparatus main body, wherein the base comprises a metal bottom plate, a signal processing circuit board, a metal weight, and a resin cover, and wherein the base supports the pair of columns via said third joint portion, said bottom plate and said weight are electrically connected to each other, and said signal processing circuit board is arranged between said bottom plate and said weight.

10. The apparatus according to claim 9, wherein said camera head is supported by one end of a first column via said first joint portion so that an optical axis direction with respect to the first column and a pivot angle about the optical axis of said camera head can be adjusted, the first column is supported at the other end thereof via said second joint portion, so that an axial direction with respect to the second column can be adjusted, and the second column is supported at a proximal end thereof via said third joint portion, so that an axial direction with respect to a vertical axis of the base and a pivot angle about the axis of the second column can be adjusted.

11. An image input apparatus in which an image signal obtained by an image pickup unit is input to an apparatus main body to perform signal processing of the input signal, comprising:

a camera head arranged at a distal end side of a pair of columns which are coupled via a plurality of joint portions;

a signal processing unit which is incorporated in a base of the apparatus main body, which supports a proximal end side of the pair of columns;

a cable which is arranged along the pair of columns and connects said camera head and said signal processing unit, and wherein the plurality of joint portions consists of a first joint portion consisting of a first hinge portion and a first pivot portion for joining said camera head with one of the pair of columns, a second joint portion consisting of a second hinge portion for joining the pair of columns, a third joint portion consisting of a third hinge portion and a second pivot portion for joining the other of the pair of columns with the base of the apparatus main body, wherein an index for indicating a direction of said camera head with respect to the base is arranged at least at a center of a front surface of the base, and wherein said index indicates the direction of said camera head with respect to the base.

12. The apparatus according to claim 11, wherein said index comprises an indication portion which is arranged at the center of the front surface of the base and indicates an operation state of said apparatus.

13. The apparatus according to claim 11, wherein said camera head is supported by one end of a first column via said first joint portion so that an optical axis direction with respect to the first column and a pivot angle about the optical axis of said camera head can be adjusted, the first column is supported at the other end thereof via said second joint portion, so that an axial direction with respect to the second column can be adjusted, and the second column is supported at a proximal end thereof via said third joint portion, so that an axial direction with respect to a vertical axis of the base and a pivot angle about the axis of the second column can be adjusted.

14. An image input apparatus in which an image signal obtained by an image pickup unit is input to an apparatus main body to perform signal processing of the input signal, comprising:

a camera head arranged at a distal end side of a pair of columns which are coupled via a plurality of joint portions;

a signal processing unit which is incorporated in a base of the apparatus main body, which supports a proximal end side of the pair of columns;

a cable which is arranged along the pair of columns and connects said camera head and said signal processing unit, and wherein the plurality of joint portions consists of a first joint portion consisting of a first hinge portion and a first pivot portion for joining said camera head with one of the pair of columns, a second joint portion consisting of a second hinge portion for joining the pair of columns, a third joint portion consisting of a third hinge portion and a second pivot portion for joining the other of the pair of columns with the base of the apparatus main body, wherein said apparatus has an arrangement that can prevent a route of said cable from interfering with pivot axes of the joint portions when said cable is laid, and wherein said first and third hinge portions in said first and third joint portions are arranged on two sides of said cable so that said cable is linearly laid along said first and third joint portions.

15. An image input apparatus in which an image signal obtained by an image pickup unit is input to an apparatus main body to perform signal processing of the input signal, comprising:

a camera head arranged at a distal end side of a pair of columns which are coupled via a plurality of joint portions;

a signal processing unit which is incorporated in a base of the apparatus main body, which supports a proximal end side of the pair of columns;

a cable which is arranged along the pair of columns and connects said camera head and said signal processing unit, and wherein the plurality of joint portions consists of a first joint portion consisting of a first hinge portion and a first pivot portion for joining said camera head with one of the pair of columns, a second joint portion consisting of a second hinge portion for joining the pair of columns, a third joint portion consisting of a third hinge portion and a second pivot portion for joining the other of the pair of columns with the base of the apparatus main body, wherein said apparatus has an arrangement that can prevent a route of said cable from interfering with pivot axes of the joint portions when said cable is laid, and wherein said cable is inserted through the respective columns, and said cable is exposed from said second joint portion that couples the columns and is laid in a loop pattern.

* * * * *

UNITED STATES PATENT AND TRADEMARK OFFICE
CERTIFICATE OF CORRECTION

PATENT NO. : 6,115,068  
DATED : September 5, 2000  
INVENTOR(S) : Kazuto Ariga and Seiji Iidai Page 1 of 1

It is certified that error appears in the above-identified patent and that said Letters Patent is hereby corrected as shown below:

<u>Column 4,</u>
Line 49, please delete "is".

Signed and Sealed this

Eighth Day of October, 2002

Attest:

JAMES E. ROGAN
Attesting Officer *Director of the United States Patent and Trademark Office*